(12) United States Patent
Ishitoya

(10) Patent No.: US 9,723,175 B2
(45) Date of Patent: Aug. 1, 2017

(54) IMAGE PROCESSING APPARATUS FOR MONOCHROME CONVERSION AND IMAGE FORMING APPARATUS INCLUDING THE SAME

(71) Applicant: RISO KAGAKU CORPORATION, Tokyo (JP)

(72) Inventor: Mitsuaki Ishitoya, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/245,350

(22) Filed: Aug. 24, 2016

(65) Prior Publication Data

US 2017/0070645 A1    Mar. 9, 2017

(30) Foreign Application Priority Data

Sep. 8, 2015 (JP) .................................. 2015-176687

(51) Int. Cl.
*H04N 1/40* (2006.01)
*B41J 2/21* (2006.01)
*H04N 1/62* (2006.01)

(52) U.S. Cl.
CPC ........ *H04N 1/40012* (2013.01); *B41J 2/2103* (2013.01); *H04N 1/62* (2013.01); *H04N 2201/0082* (2013.01)

(58) Field of Classification Search
CPC ................ H04N 1/40012; H04N 1/62; H04N 2201/0082; B41J 2/2103
See application file for complete search history.

(56) References Cited

U.S. PATENT DOCUMENTS

| 9,232,110 B2 * | 1/2016 | Hakamada | ............... H04N 1/46 |
| 2008/0094517 A1 * | 4/2008 | Takeuchi | ................ H04N 1/62 |
| | | | 348/649 |
| 2011/0122427 A1 | 5/2011 | Yabe | |
| 2012/0237121 A1 | 9/2012 | Kuboyama | |

FOREIGN PATENT DOCUMENTS

JP    10-63833    3/1998

OTHER PUBLICATIONS

Search Report issued in European Patent Office (EPO) Patent Application No. 16186295.8, dated Jan. 16, 2017.

* cited by examiner

*Primary Examiner* — Quang N Vo
(74) *Attorney, Agent, or Firm* — Greenblum & Bernstein, P.L.C.

(57) ABSTRACT

An image processing apparatus performs operations including: when a density value of a black component in uncorrected monochrome image data corresponding to each of pure colors including primary colors and secondary colors in color image data is lower than a reference density value, the uncorrected monochrome image data being obtained by a monochrome conversion from the color image data to monochrome image data, determining a correction content for correcting the density value of the black component in the uncorrected monochrome image data corresponding to at least each of the pure colors out of the pure colors and peripheral colors of the pure colors in a color space to a value equal to or higher than the reference density value; and obtaining corrected monochrome image data in which correction based on the determined correction content is reflected in the uncorrected monochrome image data.

18 Claims, 14 Drawing Sheets

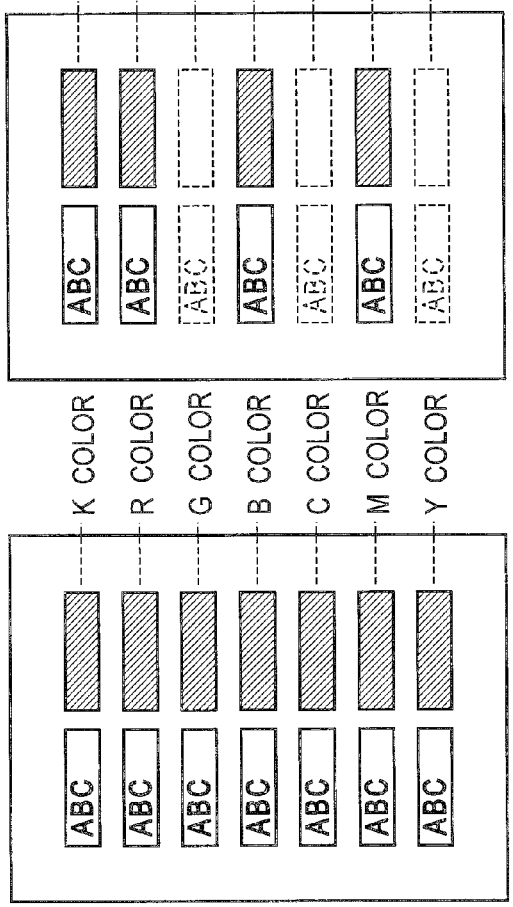

FIG. 7

| | R | G | B | L | a | b | C | M | Y | K | | C | M | Y | K |
|---|---|---|---|---|---|---|---|---|---|---|---|---|---|---|---|
| | | | | | | | RGB⇒Gray MONOCHROME (BEFORE CORRECTION) | | | | | Gray⇒DENSITY EMPHASIS MONOCHROME (AFTER CORRECTION) | | | |
| | 0 | 30 | 195 | 0 | -128 | -128 | 0 | 0 | 0 | 216 | | 0.0 | 0.0 | 0.0 | 216 |
| | 0 | 24 | 169 | 0 | -128 | -112.1 | 0 | 0 | 0 | 222 | | 0.0 | 0.0 | 0.0 | 222 |
| | 0 | 19 | 143 | 0 | -128 | -96.1 | 0 | 0 | 0 | 228 | | 0.0 | 0.0 | 0.0 | 228 |
| | 0 | 14 | 118 | 0 | -128 | -80.2 | 0 | 0 | 0 | 234 | | 0.0 | 0.0 | 0.0 | 234 |
| | 0 | 9 | 94 | 0 | -128 | -64.3 | 0 | 0 | 0 | 239 | | 0.0 | 0.0 | 0.0 | 239 |
| | 0 | 5 | 71 | 0 | -128 | -48.3 | 0 | 0 | 0 | 244 | | 0.0 | 0.0 | 0.0 | 244 |
| | 0 | 2 | 49 | 0 | -128 | -32.4 | 0 | 0 | 0 | 248 | | 0.0 | 0.0 | 0.0 | 248 |
| | 0 | 1 | 29 | 0 | -128 | -16.4 | 0 | 0 | 0 | 251 | | 0.0 | 0.0 | 0.0 | 251 |
| | 0 | 0 | 1 | 0 | -128 | -0.5 | 0 | 0 | 0 | 255 | | 0.0 | 0.0 | 0.0 | 255 |
| | 0 | 0 | 0 | 0 | -128 | -15.4 | 0 | 0 | 0 | 255 | | 0.0 | 0.0 | 0.0 | 255 |
| R (RED) | 255 | 0 | 0 | 0 | -128 | -47.3 | 0 | 0 | 0 | 179 | | 0.0 | 0.0 | 0.0 | 179 |
| G (GREEN) | 0 | 255 | 0 | 0 | -128 | -79.2 | 0 | 0 | 0 | 105 | | 0.0 | 0.0 | 0.0 | 105 |
| B (BLUE) | 0 | 0 | 255 | 0 | -128 | -111.1 | 0 | 0 | 0 | 227 | | 0.0 | 0.0 | 0.0 | 227 |
| Y (YELLOW) | 255 | 255 | 0 | -112.1 | -112.1 | -128 | 0 | 0 | 0 | 28 | | 0.0 | 0.0 | 0.0 | 85 |
| M (MAGENTA) | 255 | 0 | 255 | 0 | -112.1 | -96.1 | 0 | 0 | 0 | 150 | | 0.0 | 0.0 | 0.0 | 150 |
| C (CYAN) | 0 | 255 | 255 | 0 | -112.1 | -64.3 | 0 | 0 | 0 | 77 | | 0.0 | 0.0 | 0.0 | 85 |
| | 255 | 69 | 77 | 100 | 127 | 95.1 | 0 | 0 | 0 | 129 | | 0.0 | 0.0 | 0.0 | 129 |
| | 255 | 68 | 25 | 100 | 127 | 111.1 | 0 | 0 | 0 | 136 | | 0.0 | 0.0 | 0.0 | 136 |
| | 255 | 67 | 0 | 100 | 127 | 127 | 0 | 0 | 0 | 139 | | 0.0 | 0.0 | 0.0 | 139 |

| | R | G | B | L | a | b | C | M | Y | +1 | K |
|---|---|---|---|---|---|---|---|---|---|---|---|
| | 0 | 30 | 195 | 0 | -128 | -128 | 0 | 0 | 0 | 0 | 216 |
| | 0 | 24 | 169 | 0 | -128 | -112.1 | 0 | 0 | 0 | 0 | 222 |
| | 0 | 19 | 143 | 0 | -128 | -96.1 | 0 | 0 | 0 | 0 | 228 |
| | 0 | 14 | 118 | 0 | -128 | -80.2 | 0 | 0 | 0 | 0 | 234 |
| | 0 | 9 | 94 | 0 | -128 | -64.3 | 0 | 0 | 0 | 0 | 239 |
| | 0 | 5 | 71 | 0 | -128 | -48.3 | 0 | 0 | 0 | 0 | 244 |
| | 0 | 2 | 49 | 0 | -128 | -32.4 | 0 | 0 | 0 | 0 | 248 |
| | 0 | 1 | 29 | 0 | -128 | -16.4 | 0 | 0 | 0 | 0 | 251 |
| | 0 | 0 | 1 | 0 | -128 | -0.5 | 0 | 0 | 0 | 0 | 255 |
| | 0 | 0 | 0 | 0 | -128 | -15.4 | 0 | 0 | 0 | 0 | 255 |
| R (RED) | 255 | 0 | 0 | 0 | -128 | -47.3 | 0 | 0 | 0 | 0 | 179 |
| G (GREEN) | 0 | 255 | 0 | 0 | -128 | -79.2 | 0 | 0 | 0 | 0 | 105 |
| B (BLUE) | 0 | 0 | 255 | 0 | -128 | -111.1 | 0 | 0 | 0 | 0 | 227 |
| Y (YELLOW) | 255 | 255 | 0 | 0 | -112.1 | -128 | 0 | 0 | 0 | 0 | 85 |
| M (MAGENTA) | 255 | 0 | 255 | 0 | -112.1 | -96.1 | 0 | 0 | 0 | 0 | 150 |
| C (CYAN) | 0 | 255 | 255 | 0 | -112.1 | -64.3 | 0 | 0 | 0 | 0 | 85 |
| | 255 | 69 | 77 | 100 | 127 | 95.1 | 0 | 0 | 0 | 0 | 129 |
| | 255 | 68 | 25 | 100 | 127 | 111.1 | 0 | 0 | 0 | 0 | 136 |
| | 255 | 67 | 0 | 100 | 127 | 127 | 0 | 0 | 0 | 0 | 139 |

Gray⇒DENSITY EMPHASIS
MONOCHROME (AFTER CORRECTION)

FIG. 9

| | R | G | B | L | a | b | Gray⇒DENSITY EMPHASIS MONOCHROME (AFTER CORRECTION) | | | | | | |
|---|---|---|---|---|---|---|---|---|---|---|---|---|---|
| | | | | | | | C | M | Y | +1 | . | +N | K |
| | 0 | 30 | 195 | 0 | -128 | -128 | 0 | 0 | 0 | 0 | . | 0 | 216 |
| | 0 | 24 | 169 | 0 | -128 | -112.1 | 0 | 0 | 0 | 0 | . | 0 | 222 |
| | 0 | 19 | 143 | 0 | -128 | -96.1 | 0 | 0 | 0 | 0 | . | 0 | 228 |
| | 0 | 14 | 118 | 0 | -128 | -80.2 | 0 | 0 | 0 | 0 | . | 0 | 234 |
| | 0 | 9 | 94 | 0 | -128 | -64.3 | 0 | 0 | 0 | 0 | . | 0 | 239 |
| | 0 | 5 | 71 | 0 | -128 | -48.3 | 0 | 0 | 0 | 0 | . | 0 | 244 |
| | 0 | 2 | 49 | 0 | -128 | -32.4 | 0 | 0 | 0 | 0 | . | 0 | 248 |
| | 0 | 1 | 29 | 0 | -128 | -16.4 | 0 | 0 | 0 | 0 | . | 0 | 251 |
| | 0 | 0 | 1 | 0 | -128 | -0.5 | 0 | 0 | 0 | 0 | . | 0 | 255 |
| | 0 | 0 | 0 | 0 | -128 | -15.4 | 0 | 0 | 0 | 0 | . | 0 | 255 |
| | . | . | . | . | . | . | . | . | . | . | . | . | . |
| R (RED) | 255 | 0 | 0 | 0 | -128 | -47.3 | 0 | 0 | 0 | 0 | . | 0 | 179 |
| G (GREEN) | 0 | 255 | 0 | 0 | -128 | -79.2 | 0 | 0 | 0 | 0 | . | 0 | 105 |
| B (BLUE) | 0 | 0 | 255 | 0 | -128 | -111.1 | 0 | 0 | 0 | 0 | . | 0 | 227 |
| Y (YELLOW) | 255 | 255 | 0 | 0 | -112.1 | -128 | 0 | 0 | 0 | 0 | . | 0 | 85 |
| M (MAGENTA) | 255 | 0 | 255 | 0 | -112.1 | -96.1 | 0 | 0 | 0 | 0 | . | 0 | 150 |
| C (CYAN) | 0 | 255 | 255 | 0 | -112.1 | -64.3 | 0 | 0 | 0 | 0 | . | 0 | 85 |
| | . | . | . | . | . | . | . | . | . | . | . | . | . |
| | 255 | 69 | 77 | 100 | 127 | 95.1 | 0 | 0 | 0 | 0 | . | 0 | 129 |
| | 255 | 68 | 25 | 100 | 127 | 111.1 | 0 | 0 | 0 | 0 | . | 0 | 136 |
| | 255 | 67 | 0 | 100 | 127 | 127 | 0 | 0 | 0 | 0 | . | 0 | 139 |

IMAGE PROCESSING APPARATUS FOR MONOCHROME CONVERSION AND IMAGE FORMING APPARATUS INCLUDING THE SAME

CROSS REFERENCE TO RELATED APPLICATION

This application is based upon and claims the benefit of priority from the prior Japanese Patent Application No. 2015-176687, filed on Sep. 8, 2015, the entire contents of which are incorporated herein by reference.

BACKGROUND

1. Technical Field

The disclosure relates to an image processing apparatus which converts color image data to mono chrome image data and an image forming apparatus including the same.

2. Related Art

Japanese Unexamined Patent Application Publication No. Hei 10-63833 proposes a technique of printing and outputting inputted color image data as a monochrome image by converting the color image data to monochrome image data. In this technique, since simple monochrome conversion results in a decrease in the amount of information of the image data, the proposed technique involves the following expansion processing to improve the visibility of the monochrome image. Specifically, the color image data of each of RGB colors is first subjected to the expansion processing of expanding each pixel region including pixel values equal to or larger than a certain value, and then the resultant color image data is converted into the monochrome image data.

In the expansion processing, for each of the colors of RGB, the pixel region including the pixel values equal to or larger than the certain value is expanded to neighboring pixels around the pixel region by assigning pixel values equal to or larger than the certain value to the neighboring pixels.

SUMMARY

In monochrome conversion of the color image data, the pixel values in the monochrome image data are determined, for example, depending on the magnitude of luminance data (L component) in a Lab color solid converted from RGB, or are determined to be values converted from the pixel values in the color image data by using an NTSC luminance conversion formula or the like.

Accordingly, in the monochrome image data obtained by the monochrome conversion of the color image data subjected to the expansion processing as described above, the densities of pixels with high luminance and pixels each having a color whose weighting coefficient in the NTSC luminance conversion formula is high are increased and these pixels stand out. Meanwhile, the densities of pixels which are unlike the aforementioned pixels decrease and these pixels become less noticeable.

Hence, when the aforementioned expansion processing is performed, a portion of a picture having a relatively low density in the color image greatly changes in texture because the density is increased by the monochrome conversion at a greater degree than the density of a portion of letters and illustrations having a relatively high density in the color image.

Generally, natural colors are used in pictures and the like and artificial pure colors are used in letters and illustrations. When the density is uniformly increased by the aforementioned expansion processing without considering such differences, the density of, for example, the pure colors cannot be increased in a good manner due to the aforementioned reasons, and the textures of pictures, letters, and the like thereby change. Such changes in texture cannot be solved even by performing Gamma correction for lightness correction on the image data subjected to the monochrome conversion.

An object of the disclosure is to provide an image processing apparatus which can suppress occurrence of a great change in a texture of an image when performing processing of improving visibility in monochrome conversion of color image data, and an image forming apparatus including the same.

An image processing apparatus in accordance with some embodiments includes: a processor; and a memory including instructions that, when executed by the processor, cause the processor to per form operations. The operations include: when a density value of a black component in uncorrected monochrome image data corresponding to each of pure colors including primary colors and secondary colors in color image data is lower than a reference density value, the uncorrected monochrome image data being obtained by a monochrome conversion from the color image data including pixel values of respective color components for each pixel to monochrome image data including a density value of a black component for each pixel, determining a correction content for correcting the density value of the black component in the uncorrected monochrome image data corresponding to at least each of the pure colors out of the pure colors and peripheral colors of the pure colors in a color space to a value equal to or higher than the reference density value; and obtaining corrected monochrome image data in which correction based on the determined correction content is reflected in the uncorrected monochrome image data.

In the configuration described above, when the density value of the black component corresponding any of the pure colors is lower than the reference density value in the monochrome conversion of the pure colors in the color image data, the correction on the monochrome conversion is performed such that at least the density value of the black component corresponding to the any of pure colors, out of the density values of the black component corresponding to the any of pure colors and the peripheral color of the any of pure colors in the color space, is set to a value equal to or higher than the reference density value. By this correction, the density of an image portion in a monochrome image in which the density value of the black component falls below the reference density value in the monochrome conversion is increased, and the visibility of the image portion is improved.

Moreover, the correction of setting the density value of the black component lower than the reference density value in the uncorrected monochrome image data to a value equal to or higher than the reference density value is performed only for the pure color and the peripheral color thereof, and is not performed for other colors which do not fall under the category of the pure color and the peripheral color thereof. Accordingly, in a portion of letters in which the pure color and the peripheral color thereof are used in many cases, even when the density value of the black component in the uncorrected monochrome image data is converted to a value lower than the reference density value by the monochrome conversion, the density value is corrected to a density value equal to or higher than the reference density value and the texture in the color image is thereby maintained also in the monochrome image.

Moreover, in a portion of a picture which includes colors not falling into the category of the pure color and the peripheral color thereof in many cases, the density value of the black component in the monochrome data before correction which is converted to a value lower than the reference density value by the monochrome conversion is not corrected and is left as it is. The texture in the color image is thereby maintained also in the monochrome image.

Accordingly, a great change in the texture of the image is less likely to occur when the processing of improving the visibility is performed in the monochrome conversion of the color image data.

Specifically, in an image portion of the pure color in which the density value of the black component corresponding to the pure color in the original color image becomes lower than the reference density value when the inputted color image data is subjected to the monochrome conversion, the density in the monochrome image subjected the monochrome conversion is such a low density that the visibility of the image is impaired.

Accordingly, in the configuration described above, when the density value of the black component falls below the reference density value in the monochrome conversion, the correction contents of the monochrome conversion are determined such that the density value of the black component becomes equal to or higher than the reference density value, and there is obtained the corrected monochrome image data in which the correction based on the determined correction contents is reflected in the uncorrected monochrome image data.

Pixels in a portion of letters and illustrations in the color image include more components of the pure color and the peripheral color thereof than pixels in a picture portion. Accordingly, when the monochrome conversion corrected by the determined correction contents is performed on the color image data, the corrected monochrome image data as follows is obtained: in the portion of letters and illustrations including many components of the pure color and the peripheral color thereof, the density of an image portion which uses the pure color in the color image and which would otherwise have low density and become less visible by the monochrome conversion is increased to a density visible also in the monochrome image.

The density increase for improving visibility after the monochrome conversion is thus made less likely to occur in the picture portion in the color image compared to the portion of letters and illustrations, and a great change in the texture of the picture portion due to the density increase in the monochrome conversion can be thereby made less likely to occur.

Moreover, in the portion of letters and illustrations including many components of the pure color and the peripheral color thereof, the textures of the letters and illustrations do not change greatly when the density is increased to improve the visibility after the monochrome conversion of the color image data. Meanwhile, the visibility of the letters and illustrations which are visible in the color image having color information is secured also in the monochrome image having no color information.

Accordingly, a great change in the texture of an image is made less likely to occur when the color image data is subjected to processing of improving the visibility in the monochrome conversion.

The reference density value may be provided for each of the pure colors, and the operation may include, when the density value of the black component in the uncorrected monochrome image data corresponding to each of the pure colors is lower than the reference density value corresponding to each of the pure colors, determining the correction content for correcting the density value of the black component in the uncorrected monochrome image data corresponding to each of the pure colors to the value equal to or higher than the reference density value corresponding to each of the pure colors.

In the configuration described above, in the case where the original pure colors in the color image data vary from, one another and the density values of the black component corresponding to the respective pure colors in the monochrome image data after the monochrome conversion and before correction thereby vary from one another, the correction is performed such that the density values of the black component are increased to values equal to or higher than the reference density values corresponding to the respective original pure colors when the density values are lower than these reference density values.

Accordingly, variations between the pixels different in original color in the color image data which correspond to variations in the density values of the black component in the uncorrected monochrome image data also occur in the density values of the black components in the corrected monochrome image data. Thus, differences in appearance corresponding to the lightness and the like of the original colors in the color image before the monochrome conversion can be reproduced more easily in the monochrome image when the correction of increasing the density is performed to improve the visibility of the monochrome image.

The image processing apparatus may further include a storage storing profile data in which the pixel values of the colors in the color image data are associated with density values of the black component determined based on the determined correction content. The operation may include performing the monochrome conversion and obtaining the corrected monochrome image data simultaneously by using the profile data stored in the storage.

In the configuration described above, the determined correction contents are reflected in the profile data used to convert the pixel values of the respective color components in the color image data to the density value of the black component in the corrected monochrome image data.

Accordingly, in the case of reflecting the determined correction contents in the monochrome conversion of the color image data, there is no need to determine whether each of pixels in the color image data is a pixel being a target in which the correction contents are to be reflected. Hence, it is possible to reduce load of processing of reflecting the determined correction contents in the monochrome conversion of the color image data.

The operation may include calculating the density value of the black component in the corrected monochrome image data from the pixel values of the respective color components in the color image data based on the determined correction content.

In the configuration described above, the determined contents are reflected in contents of calculation in which the density value of the black component in the corrected monochrome image data is calculated from the pixel values of the respective color components in the color image data.

Accordingly, for a pixel being a target in which the determined correction contents are to be reflected in the monochrome conversion of the color image data, the density value of the black component in the corrected monochrome image data can be easily calculated from the pixel values in the color data by using the contents of calculation in which the correction contents are reflected.

The operation may further include: calculating, for image data of each of pages included in the color image data, an image rate determined based on the pixel values of at least each of the pure colors out of the pure colors and the peripheral colors; and when the density value of the black component in the uncorrected monochrome image data corresponding to each of the pure colors is lower than the reference density value, determining, as the correction content, a correction rate of the density value of the black component in the uncorrected monochrome image data corresponding to each of the pure colors, for the image data of each of the pages, based on at least the calculated image rate for each of the pure colors in each of the pages.

In the configuration described above, the image rate such as, for example, the coverage rate and the image percentage for each color which is determined based on the pixel values of at least each pure color is calculated for each page in the color image data. This makes it possible to, when a pure color whose density value falls below the reference density value due to the monochrome conversion and which thereby becomes less visible in the monochrome image exists, recognize at what image rate such a pure color exists in each page.

Accordingly, it is possible to determine the correction rate for the density value of the black component used to increase the density after the monochrome conversion, depending on the degree of existence, in the same page, of pixels of the pure color whose density value falls below the reference density value due to the monochrome conversion and which thereby becomes less visible in the monochrome image. Then, by correcting the density value of the black component, the density of such pixels can be set to a more appropriate density in terms of the visibility of the monochrome image.

The operation may further include, when the density value of the black component in the uncorrected monochrome image data corresponding to each of the pure colors is lower than the reference density value, determining at least one of a range of the peripheral color to be included in a correction target and a correction rate of the density value of the black component in the uncorrected monochrome image data corresponding to the peripheral color based on at least the calculated image rate for each of the pure colors, and determining the correction content for the image data of each of the pages.

In the configuration described above, it is possible to determine at least one of the correction rate for the density value of the black component used to increase the density after the monochrome conversion and the range of the peripheral color to be subjected to the correction of the density value, depending on the degree of existence, in the same page, of the pixels of the peripheral color of the pure color whose density value falls below the reference density value due to the monochrome conversion and which thereby becomes less visible in the monochrome image. Then, by correcting the density value of the black component, the density of such pixels can be set to a more appropriate density in terms of the visibility of the monochrome image.

An image forming apparatus in accordance with some embodiments includes: the image processing apparatus; a printing unit; and a controller configured to drive the printing unit to print a monochrome image by using the corrected monochrome image data obtained by the image processing apparatus.

In the configuration described above, the printing unit can be made to print a monochrome image in which the effects obtained by the image processing device described above are exhibited.

BRIEF DESCRIPTION OF DRAWINGS

FIG. 4A is an explanatory view illustrating a color image before the monochrome conversion.

FIG. 4B is an explanatory view illustrating a monochrome image subjected to the monochrome conversion using the calculation formula based on the NTSC standards and to the Gamma correction.

FIG. 4C is an explanatory view illustrating a monochrome image obtained by performing correction on the monochrome image data subjected to the Gamma correction.

FIG. 7 is an explanatory view illustrating an example of contents of a lookup table stored in an external storage of the control unit in FIG. 1.

FIG. 8 is an explanatory view illustrating another example of contents of the lookup table stored in the external storage of the control unit in FIG. 1.

FIG. 9 is an explanatory view illustrating yet another example of contents of the lookup table stored in the external storage of the control unit in FIG. 1.

DETAILED DESCRIPTION

Figure 1:
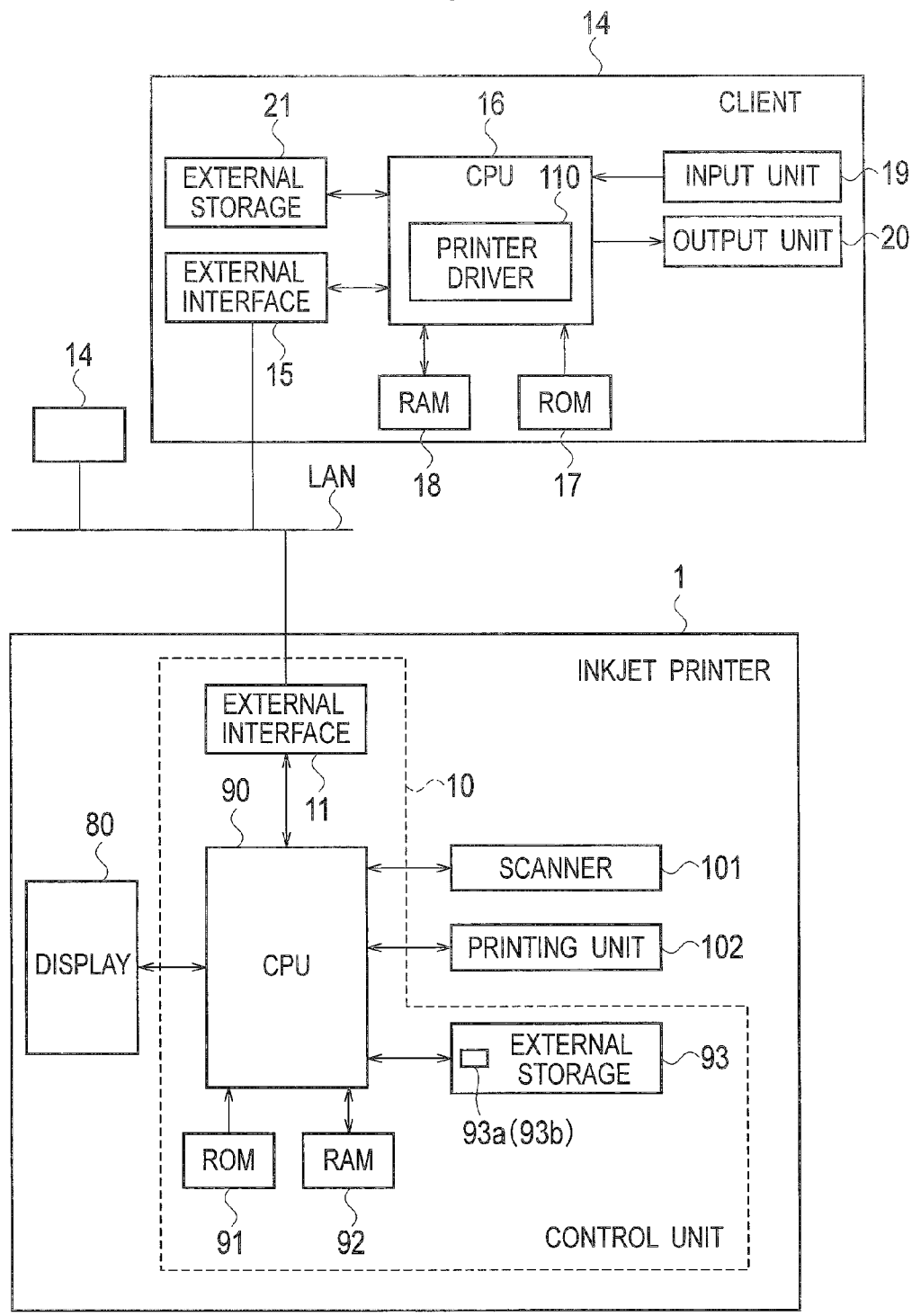
FIG. 1 is a block diagram illustrating a schematic configuration of a printer network system in one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

An embodiment of the present invention is described below with reference to the drawings. FIG. 1 is an explanatory view illustrating a schematic configuration of a printer network system in one embodiment. Note that an inkjet printer 1 in the embodiment, illustrated in FIG. 1 is assumed to be an inkjet line color printer.

Configuration of Printer Network System

As illustrated in FIG. 1, the printer network system of the embodiment includes the inkjet printer 1 and multiple clients 14.

Configuration of Client

Each of the clients 14 is formed of a personal computer (PC) or the like and is connected to a local area network LAN via an external interface 15. The client 14 has a CPU 16 configured to execute various types of processing based on control programs stored in a ROM 17. A RAM 18 configured to function as a working area, an input unit 19 including a keyboard, a mouse, and the like, an output unit 20 including a liquid crystal display and the like, and an external storage 21 (storage) are connected to the CPU 16.

When a print request of original data generated by an application program stored in the external storage 21 is inputted from the input unit 19 into the CPU 16, the CPU 16 activates a printer driver program stored in the external storage 21 to virtually build a printer driver 110. The build printer driver 110 generates a print job of the original data corresponding to the inputted print request, and outputs the generated print job from the external interface 15 to an external interface 11 of a control unit 10. The print job includes print setting information such as settings of the size of a print sheet and a color mode (color/monochrome).

Configuration of Inkjet Printer

The inkjet printer 1 is connected to the local area network LAN via the external interface 11. The inkjet printer 1 includes a scanner 101 configured to scan an image information on an original as a print image and output an image signal, a printing unit 102 configured to print the print image on the print sheet based on the image signal outputted from the scanner 101 or the print job received from the client 14, and the control unit 10 for control of the entire apparatus. The print sheet used in the printing is conveyed from a not-illustrated paper feed unit to a not-illustrated paper delivery unit via the printing unit 102.

The control unit 10 includes a CPU 90. The CPU 90 controls a scanning operation of the original image by the scanner 101, a printing operation of the print image by the printing unit 102, and similar operations, based on programs and setting information stored in a ROM 91, according to contents inputted and set from a display 80.

The control unit 10 is provided, with a RAM 92. The print job inputted from the client 14 to the control unit 10, setting contents such as copying conditions (number of copies, copying magnification, scale, and the like) of the original image inputted from the display 80, and the like are stored in the RAM 92 as needed.

The RAM 92 is provided with a frame memory region. Raster data of the print image generated by the CPU 90 based on the print job from the client 14 or the image signal from the scanner 101 is temporarily stored in the frame memory region until the raster data is outputted to the printing unit 102.

The control unit 10 is provided with an external storage 93 (storage). The external storage 93 is connected to the CPU 90. The external storage 93 has multiple regions for storing the print job transferred from the aforementioned RAM 92, and various types of tables, counters, and the like are stored in the external storage 93.

When receiving the print job of the print image from each of the clients 14, the CPU 90 of the control unit 10 generates the raster data of the print image, and causes the printing unit 102 to print the print image on the print sheet under the condition specified in the print setting information of the print job.

For example, when receiving the image signal of the original image scanned by the scanner 101 from the original being a copy source, the CPU 90 of the control unit 10 generates the print data of the original image and performs copy printing of the original image on the print sheet under the copying conditions (number of copies, copying magnification scale, and the like) inputted from the display 80 connected to the control unit 10.

Method of Monochrome Conversion

The CPU 90 of the control unit 10 performs color conversion processing on the image data when the print job from the client 14 includes contents of printing the color print image in monochrome and when the copying condition of the original image inputted from the display 80 includes contents of printing the color original image scanned by the scanner 101 in monochrome.

Specifically, when the print image and the original image are printed in monochrome, RGB color image data of the print image and the original image is subjected to color conversion to monochrome image data.

In the embodiment, the monochrome image data is expressed by using a K (black) density value which indicates the density of each of pixels in the monochrome image. Accordingly, density values of ink colors (CMY) used in the printing by the printing unit 102 of the inkjet printer 1 other than K (black) are all set to "0." In this description, the K (black) density value is a value of a print system, and is calculated from a K (black) pixel value which is a value of a display system.

For example, the K (black) pixel value can be calculated by using a calculation formula for converting the color image data into monochrome data with pixel values of RGB being weighted based on the NTSC standards (K (black) pixel value after monochrome conversion (monochrome pixel value)=0.3R (red pixel value)+0.59G (green pixel value)+0.11B (blue pixel value)).

In the case of 8-bit data, the K (black) density value is expressed by a numerical value with 256 levels from 0 (white) to 255 (black) which is obtained by subtracting, from "255," the monochrome pixel value (K (black) pixel value) with 256 levels from 0 (black) to 255 (white). Accordingly, the lower the K (black) density value is (the closer the value is to 0) in the monochrome image data, the lower the density is in the monochrome image, and the higher the K (black) density value is (the closer the value is to 255) in the monochrome image data, the higher the density is in the monochrome image.

As a general method of performing the monochrome conversion on the color image data, it is possible to use a method of converting the color image data into the monochrome data by extracting, for example, a G (green) component of RGB which is a secondary color obtained by mixing primary colors of CMY and using the pixel value of the extracted G (green) component, a method of converting the color image data into the monochrome data by using a lightness (L) component obtained by developing RGB components into a color solid of lightness (L) being a brightness component and of hue and chroma (a, b) being color components, a method of converting the color image data into the monochrome data by weighting the pixel values of RGB based on the NTSC standards, and similar methods.

Particularly, in the method of converting the color image data into the monochrome data by using the pixel values of RGB weighted based on the NTSC standards or the lightness (L) component obtained by performing development into the Lab color solid, the monochrome pixel value of each pixel which is required to determine the K (black) density value thereof in the monochrome image data can be obtained from the lightness (L) component or the weighted RGB pixel values by using a calculation formula.

In the embodiment, the method of converting the color image data into the monochrome data by using the pixel values of RGB weighted based on the NTSC standards is assumed to be used for the monochrome conversion of the color image data. Accordingly, the K (black) pixel value (monochrome pixel value) in the monochrome image data which is a value of the display system is calculated by using the aforementioned calculation formula of K (black) pixel value (monochrome pixel value) after monochrome conversion=0.3R (red pixel value)+0.59G (green pixel value)+0.11B (blue pixel value). In this calculation formula, 0.3 is a weighting coefficient of R (red), 0.59 is a weighting coefficient of G (green), and 0.11 is a weighting coefficient of B (blue).

Figure 2:
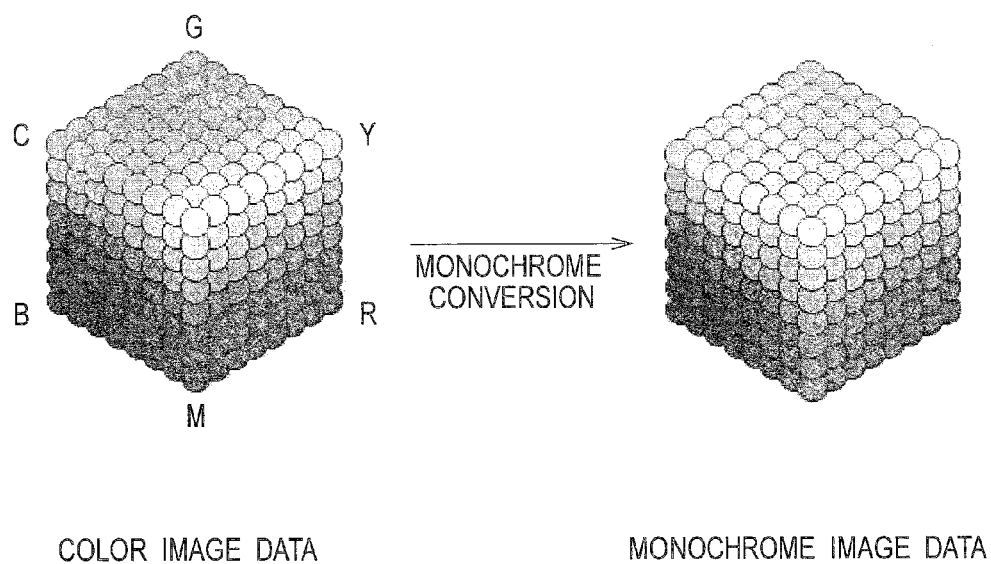
FIG. 2 is an explanatory view illustrating a relationship between a RGB color solid model expressing color image data before monochrome conversion using a monochrome conversion calculation formula based on the NTSC standards and a monochrome color solid model expressing monochrome image data subjected to the monochrome conversion.

FIG. 2 is an explanatory view illustrating a relationship between a RGB color solid model (on the left side in the drawing) expressing the color image data before the monochrome conversion using the aforementioned monochrome conversion calculation formula based on the NTSC standards and a monochrome color solid model (on right side in the drawing) expressing the monochrome image data subjected to the monochrome conversion.

In the color solid models of FIG. 2, the pieces of image data before and after the monochrome conversion are each expressed by using a cube in which white (R, G, B=255, 255, 255 in an 8-bit mode) is arranged at its center with colors of G (green), Y (yellow), R (red), M (magenta), B (blue), and C (cyan) arranged respectively at its vertices in this order in the clockwise direction starting from the vertex at the top.

In the color solid model of the color image data illustrated on the left side of FIG. 2, eight spheres (circles) are arranged in each side and indicate pieces of color image data of colors expressed in an 8-bit resolution in the RGB color image data. Each of the colors defined by the respective spheres is defined by pixel values of RGB in a range of 0 to 255 (two to the power to eight) in the color image data.

Moreover, the color solid model of the monochrome image data illustrated on the right side of FIG. 2 illustrates the monochrome image data obtained by subjecting each of the colors defined by the respective spheres (circles) in the color solid model of the color image data to the monochrome conversion in the 8-bit resolution by using the calculation formula based on the NTSC standards. The monochrome image corresponding to each of the colors defined by the respective spheres (circles) is defined by the K (black) density value in a range of 0 (white) to 255 (black) in the monochrome image data.

Density Characteristic of Monochrome Image Data

As illustrated in FIG. 2, when the color image data is subjected to the monochrome conversion, out of the primary colors of CMY and the secondary colors of RGB, that is pure colors, components of Y (yellow) and the like with relatively high lightness have low density values in the monochrome image data, and visibility thereof as an image becomes lower than that in the color image. The visibility of portions corresponding to the colors of Y (yellow) and the like in the monochrome image which decreases from that in the color image due to the monochrome conversion as described above does not change when Gamma correction compensating lightness of a mid-tone which becomes dark compared to black and white is performed, because the density values corresponding to the colors of Y (yellow) and the like are not corrected to higher values.

Figure 3A:
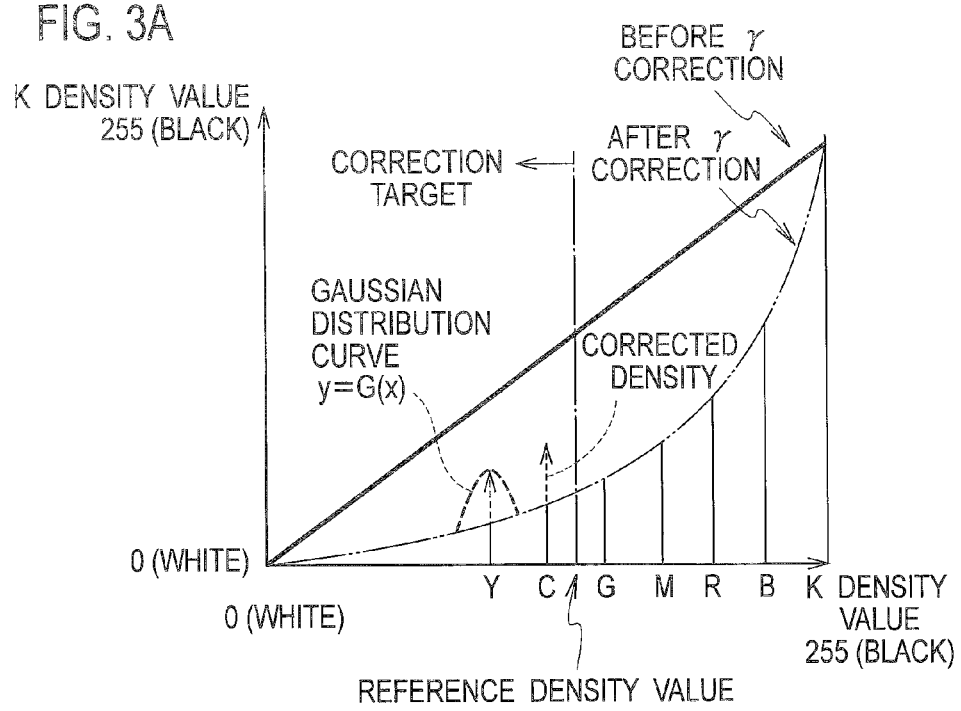
FIG. 3A is a graph illustrating characteristics of a black density value in the monochrome image data before and after Gamma correction, the monochrome image data obtained by performing the monochrome conversion on the color image data.
Figure 3B:
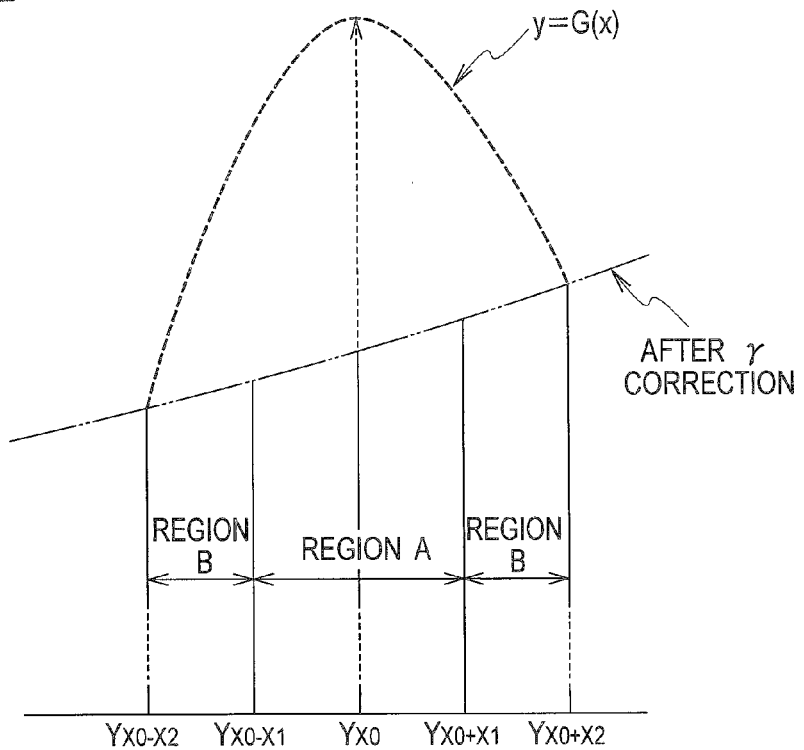
FIG. 3B is a graph illustrating, in an enlarged manner, a portion in which a Gaussian distribution curve is used to specify a range of yellow and a peripheral color thereof in the characteristic after the Gamma correction in FIG. 3A.

FIG. 3A is a graph illustrating the characteristics of the black density value in the monochrome image data before and after the Gamma correction, the monochrome image data obtained by performing the monochrome conversion on the color image data. FIG. 3B is a graph illustrating, in an enlarge manner, a portion in which a Gaussian distribution curve is used to specify a range of yellow and a peripheral color thereof in the characteristic after the Gamma correction in FIG. 3A. Note that, in the graphs of FIGS. 3A and 3B, the solid line indicate the characteristic of the monochrome image data before the Gamma correction and the two-dot chain line indicate the characteristic of the monochrome image data after the Gamma correction.

As illustrated in FIG. 3A, a color (for example, Y (yellow)) whose K (black) density value in the monochrome image data is low even after the Gamma correction has a low density in the monochrome image and the visibility thereof in the image is low.

Specifically, when the color image data (RGB data and CMYK data) is subjected to the monochrome conversion and color information is lost, the color which has high lightness (brightness) in the color printing and which therefore has a low density becomes less visible compared to the case where the color printing is performed by using the color image data. In other words, when the monochrome printing is performed by using the monochrome image data subjected to the monochrome conversion, an image portion of a color which has high lightness (brightness) in the color image has a low density in the monochrome image and is difficult to recognize.

Moreover, when the Gamma correction is performed, the K (black) density value in the monochrome image data corresponding to a component of, for example, C (cyan) or the like which becomes a mid-tone after the monochrome conversion is corrected to a low density value by the Gamma correction, and the visibility as an image becomes lower than that in the color image.

FIG. 4A is an explanatory view illustrating a color image before the monochrome conversion. FIG. 4B is an explanatory view illustrating a monochrome image subjected to the monochrome conversion using the calculation formula based on the NTSC standards and to the Gamma correction. FIG. 4C is an explanatory view illustrating a monochrome image obtained by performing correction on the monochrome image data subjected to the Gamma correction.

In the color image illustrated in FIG. 4A, letters (left portions surrounded by frames) and illustrations (right portions shaded by diagonal lines) in K (black), R (red), G (green), B (blue), C (cyan), M (magenta), and Y (yellow) are arranged in this order from the top. Note that, in FIGS. 4A to 4C, the densities of the images are expressed by dotted lines, thin solid lines, and bold solid lines, in the ascending order of density.

Out of the letters and illustrations in the various colors in the color image of FIG. 4A, the letters and illustration in Y (yellow) in the bottom row and the letters and illustration in C (cyan) in the third row from the bottom clearly have low densities and are less visible in the monochrome image illustrated in FIG. 4B in which the letters and illustrations are subjected to the monochrome conversion and the Gamma correction in normal methods. The letters and illustration in G (green) in the third row from the top also have relatively high lightness like Y (yellow), and thus have a low density and are less visible in the monochrome image illustrated in FIG. 4B.

Figure 5C:
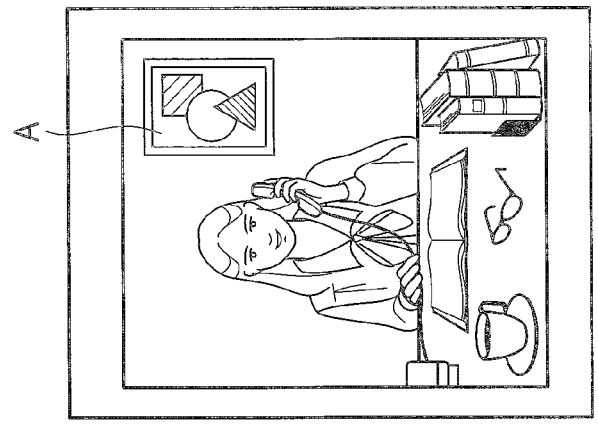
FIG. 5C is an explanatory view illustrating a monochrome image of the picture obtained by performing correction on the monochrome image data subjected to the Gamma correction.
Figure 5B:
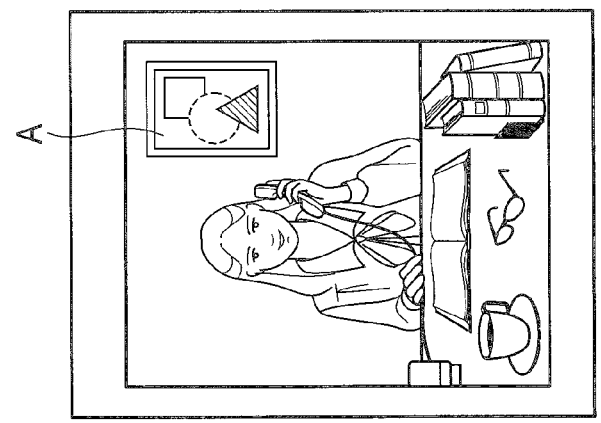
FIG. 5B is an explanatory view illustrating a monochrome image of the picture subjected to the monochrome conversion using the calculation formula based on the NTSC standards and to the Gamma correction.
Figure 5A:
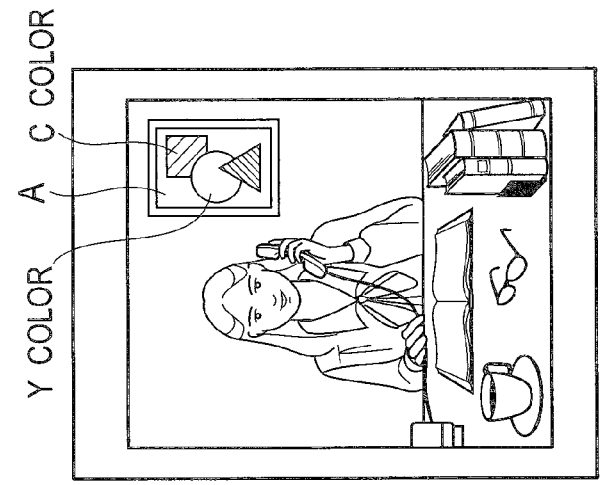
FIG. 5A is an explanatory view illustrating a color image of a picture before the monochrome conversion.

FIG. 5A is an explanatory view illustrating a color image of a picture before the monochrome conversion. FIG. 5B is an explanatory view illustrating a monochrome image of the picture subjected to the monochrome conversion using the calculation formula based on the NTSC standards and to the Gamma correction. FIG. 5C is an explanatory view illustrating a monochrome image of the picture obtained by performing correction on the monochrome image data subjected to the Gamma correction.

In the color image of the picture illustrated in FIG. 5A, there are captured a person and, on the upper right side of the person, an illustration A in a frame which has a circular illustration in Y (yellow) and a rectangular illustration in C (cyan). Note that, in FIGS. 5A to 5C, the densities of portions of the illustration A are expressed by dotted lines, solid lines, scarcely-arranged diagonal lines, and densely-arranged diagonal lines, in the ascending order of density.

When the color image data of the color image of the picture illustrated in FIG. 5A is simply subjected to the monochrome conversion and the Gamma correction, as illustrated in FIG. 5B, the densities of the portions of the circular illustration in Y (yellow) and the rectangular illustration in C (cyan) in the illustration A decrease, and the visibility of these portions decreases.

To counter this, in the embodiment, the correction is performed for the colors of Y (yellow) and C (cyan) in the color image data such that the K (black) density values corresponding to these colors in the monochrome image data are each increased to a density value higher than the density value obtained by subtracting, from "255," the K (black) pixel value (monochrome pixel value) after the monochrome conversion and the Gamma correction, and the densities of these colors in the monochrome image are thereby increased. This can increase the densities of the portions of the circular illustration in Y (yellow) and the rectangular illustration in C (cyan) as illustrated in FIG. 5C and make these portions more visible.

When the CPU 90 of the control unit 10 illustrated in FIG. 1 performs the monochrome conversion on the color image data, the CPU 90 corrects the K (black) density values in the monochrome image data such that the densities of color components which become difficult to recognize (less visible) in the monochrome image than in the color image due to the monochrome conversion are increased and these color components are made more recognizable (more visible) as illustrated in the explanatory views of FIGS. 4C and 5C.

When this correction is performed, the K (black) density values in the monochrome image data corresponding to portions of pure colors such as, for example, Y (yellow) and C (cyan) which become difficult to recognize in the monochrome image are increased to make these portions more recognizable, and the densities of these portions are increased in the monochrome image. Accordingly, a reproduction range in image portions of colors such as Y (yellow) and C (cyan) in the color image can be expanded in the monochrome image compared to that before the correction of increasing the density in the monochrome image.

Characteristics of Monochrome Image Data after Density Correction

The reproduction range in the monochrome image in the case where the aforementioned correction is performed is described below by using the exemplary view of FIG. 6. The exemplary view of FIG. 6 uses a color space at certain brightness L in the Lab color solid to illustrate the reproduction range of the colors in the monochrome image data before and after the correction performed by the CPU 90 on the monochrome image data subjected to the Gamma correction. Note that the broken line in FIG. 6 indicate the reproduction range before the correction and the solid line indicates the reproduction range after the correction.

Figure 6:
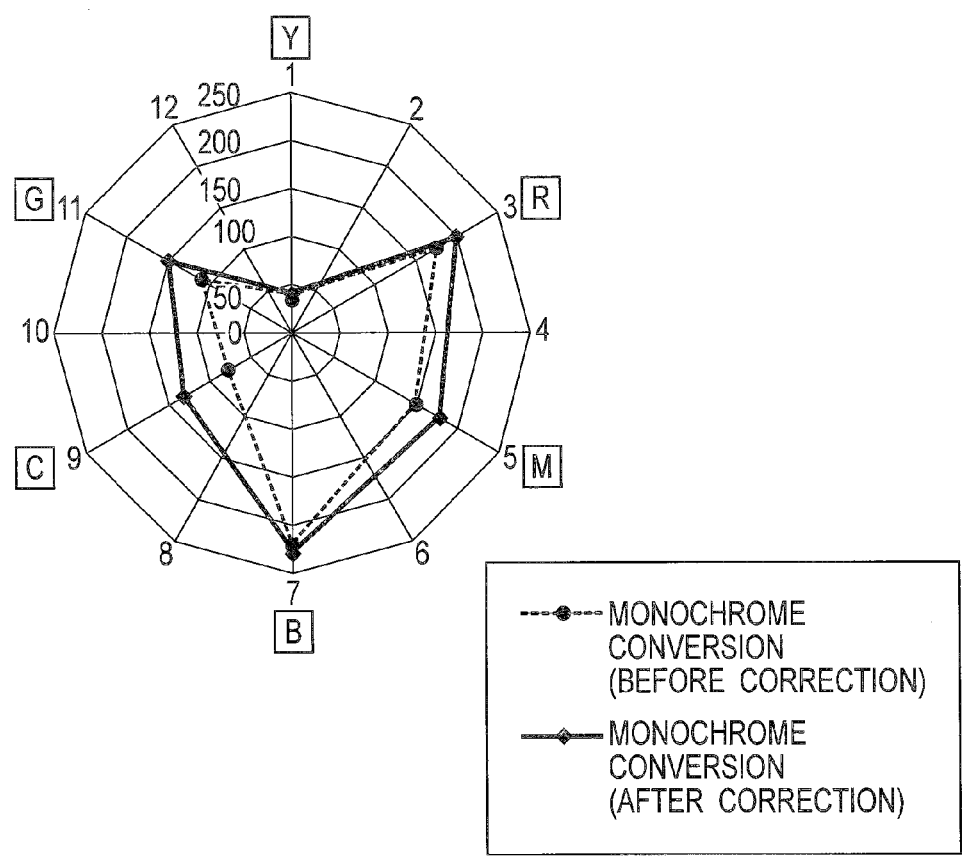
FIG. 6 is an explanatory view illustrating reproduction range of colors in the monochrome image data before and after the correction performed by a CPU in a control unit of FIG. 1 on the monochrome image data subjected to the Gamma correction.

As is apparent from the comparison between the reproduction range before the correction and the reproduction range after the correction illustrated in FIG. 6, the correction performed by the CPU 90 of the embodiment on the monochrome image data subjected to the Gamma correction is correction in which the reproduction range in the monochrome image subjected to the Gamma correction, which conventionally include only relatively dull colors in the color image before the monochrome conversion, is expanded to slightly lighter and more vivid colors in the color image before the monochrome conversion. In other words, the correction performed by the CPU 90 is correction in which portions with low visibility in the monochrome image subjected to the monochrome conversion and the Gamma correction as illustrated in FIGS. 4B and 5B are made more visible as illustrated in FIGS. 4C and 5c.

Note that colors being targets of correction described above can include, for example, pure colors, that is primary colors (CMY) and secondary colors (RGB). In an image created by arbitrarily selecting colors such as letters and illustrations, the proportion of a region in which the pure colors (primary colors and secondary colors) are used is great. Meanwhile, in an image of a picture like one illustrated in FIG. 5A, many objects of natural colors including colors other than the pure colors are generally captured.

Accordingly, performing the aforementioned correction on images of letters, illustrations, and the like is very useful for improving the visibility of such images, but performing the aforementioned correction on a color image of a picture like one illustrated in FIG. 5A without limiting the target color may change the texture of the picture as a whole.

In view of this, excluding colors other than pure colors from the correction target color may enable improving the visibility of letters, illustrations, and the like which use the pure colors in many cases through the correction, while suppressing a degree of impairing the texture of a picture image. This exclusion may also enable improving the visibility of a portion of, not the natural colors, but the pure colors in a picture like the illustration A in the frame captured in the upper right portion of the color image of the picture shown in FIG. 5A, without impairing the texture of an image as a picture. The correction target colors may thus be limited to the pure colors. In this case, as illustrated by the upward arrows of dotted lines in FIG. 3A, only the K (black) density values of the target colors in the monochrome image data are corrected in a pin-point manner to high density values, and the densities corresponding to these colors in the monochrome image are increased.

Since the CPU 90 performs the aforementioned correction on the K (black) density value in the monochrome image data, an image processing apparatus according to the embodiment of the present invention is provided in the control unit 10 of the inkjet printer 1 in the embodiment. Moreover, the printing unit 102 and the control unit 10 of the inkjet printer 1 form an image forming apparatus in the embodiment of the present invention. Note that the monochrome image data which is the target of the K (black) density value correction does not have to be data subjected to the Gamma correction in addition to the monochrome conversion. Data not subjected to the Gamma correction can be the target of the K (black) density value correction as long as the data is the monochrome image data subjected to the monochrome conversion.

Method of Correcting Density of Monochrome Image Data

Description is given of an outline of the monochrome conversion of the color image data including the correction described above which is performed by the CPU 90 of the control unit 10. First, the color image data is subjected to the monochrome conversion by using the calculation formula for the monochrome conversion based on the NTSC standards, and the K (black) density values in the monochrome image data corresponding to the pure colors are corrected. Then, the Gamma correction for compensating the lightness of the mid-tone can be performed.

Next, the CPU 90 of the control unit 10 extracts, from the color image data, pixels of the pure colors (primary colors and secondary colors) whose K (black) density values in the monochrome image data subjected to the monochrome conversion (also subjected to the Gamma correction as necessary, the same applies hereafter) fall below a reference density value, and corrects the density values of the extracted pixels which are obtained from the monochrome pixel values (K (black) pixel values) after the monochrome conversion, such that the density in the monochrome image is increased to improve visibility.

Specifically, the reference density value is a density value used by the CPU 90 to determine whether the K (black) density value in the monochrome image data obtained by subjecting the color image data to the monochrome conversion is a target of the correction of increasing the density value.

Note that the reference density value can be obtained and determined through experiments. For example, the reference density value can be obtained as follows: the color image before the monochrome conversion and the monochrome image subjected to the monochrome conversion are printed; out of the pure color (primary colors and secondary color) image portions in the color image, a pure color image portion which has a low density in the monochrome image and is difficult to recognize in the monochrome image is specified; and a minimum K (black) density value which is higher than the K (black) density value of the specified pure color in the monochrome image data obtained by subjecting the color image data to monochrome conversion and which is required to make the monochrome image more visible is set as the reference density value.

When multiple colors are specified as pure colors which have low densities in the monochrome image and which are difficult to recognize in the monochrome image, it is only necessary to at least set the reference density value to a density value higher than the highest one of multiple K (black) reference density values in the monochrome image data which are determined as described above and which correspond to the respective specified pure colors in the monochrome image data.

For example, in a Y (yellow) image portion, the K (black) density value obtained by the monochrome conversion is low. Thus, the Y (yellow) image portion in the monochrome image has a low density and is difficult to recognize. Moreover, in a C (cyan) image portion, the K (black) density value obtained by performing the Gamma correction after the monochrome conversion is also low relative to the K (black) density values corresponding to other colors. Thus, the C (cyan) image portion in the monochrome image has a low density and is difficult to recognize. Meanwhile, in image portions of the other pure colors, the K (black) density values obtained by the monochrome conversion are high. Thus, the image portions of other pure colors in the monochrome image have high densities and are easily recognizable.

In this case, in the monochrome image, the closer the K (black) density value of an image portion is to 0, the closer the image portion is to white and the lower the density of the image portion is. Meanwhile, the closer the K (black) density value of an image is to 255, the closer the image portion is to black and the higher the density of the image portion is. Accordingly, in the embodiment, it is assumed that the pure colors (primary colors and secondary colors) whose K density values in the monochrome image data subjected to the monochrome conversion is lower than the reference density value have insufficient densities in the monochrome image, and the CPU 90 determines such colors as target colors whose K (black) density values in the monochrome image data are to be corrected such that the densities of image portions corresponding these colors are increased and the image portions are made more visible. The pure colors whose K (black) density values do not reach the reference density value can be thereby set as the correction target colors.

Accordingly, when the reference density value is to be set such that the K (black) density values in the monochrome image data corresponding to Y (yellow) and C (cyan) pixels are to be included in the correction target, the reference density value is set to a value between a group of the K (black) density values in the monochrome image data corresponding to the colors of Y (yellow) and C (cyan) and a group of the K (black) density values in the monochrome image data corresponding to the other pure colors. Next, description is given of specific examples of numerical values of the K (black) density values in the monochrome image data corresponding to the colors of Y (yellow) and C (cyan).

FIG. 7 is an explanatory view illustrating an example of contents of a lookup table (LUT) used by the CPU 90 of the embodiment in the monochrome conversion of the color image data. As illustrated in FIG. 1, the external storage 93 of the control unit 10 in the inkjet printer 1 stores a lookup table (LUT) 93a used to convert the pixel values in the color image data to the density values in the monochrome image data. The LUT 93a is profile data including a table in which the pixel values of the colors of RGB in the color image data are associated with the K (black) density values in the monochrome image data corresponding to these pixel values.

In detail, as illustrated in FIG. 7, the LUT 93a is a table in which the pixel values of each color in the RGB color image data and the values of lightness (L) and chroma (a, b) in the Lab color solid corresponding to these pixel values are associated with a corresponding one of the density values in the monochrome image data subjected to the monochrome conversion. In FIG. 7, the portion on the left of the arrow in FIG. 7 shows a state before the correction of the density values lower than the reference density value, and the portion on right of the arrow shows a state after the correction. The K (black) density values before the correction which are shown on the left of the arrow are each a value obtained by subtracting the monochrome pixel value (K (black) pixel value) from "255" as described above. Moreover, the monochrome pixel value is a value calculated by using the aforementioned calculation formula (monochrome pixel value=0.3R+0.59G+0.11B) based on the NTSC standards.

Note that, when ink colors used in the printing by the printing unit 102 of the inkjet printer 1 include colors other than the four colors of CMYK (for example, china red, gray, and the like), the LUT 93a includes the density values of these ink colors.

For example, when the ink colors used in the printing by the printing unit 102 include five colors, that is one more color in addition to CMYK, as illustrated in the explanatory view of FIG. 8, the LUT 93a is configured to include a column defining the density values of an ink color of "+1." Moreover, when the ink colors used in the printing by the printing unit 102 include N more colors in addition to CMYK, as illustrated in the explanatory view of FIG. 9, the LUT 93a is configured to include columns defining the density values of ink colors of "+1" to "+N."

In the LUT 93a of FIG. 7, the K (black) density value before the correction corresponding to Y (yellow), which has insufficient density and becomes less visible due to the monochrome conversion in the monochrome image, is defined as "28," and the K (black) density value before the correction corresponding to C (cyan) is similarly defined as "77." Moreover, in the LUT 93a, the K (black) density values in the monochrome image data corresponding to the other colors which do not become less visible due to insufficient densities are defined as, for example, in the case of G (green), "105."

Accordingly, for example, the aforementioned reference density value can be set to "85" being a density value between "105" which is the K (black) density value corresponding to G (green) and "77" which is the K (black) density value corresponding to C (cyan) and which is the higher value out of the K (black) density values before the correction corresponding to Y (yellow) and C (cyan) in the monochrome image data.

When the reference density value is set to "85," the CPU 90 sets pixels of colors whose K (black) density values before the correction are lower than "85" (density values in the monochrome image are lower than the reference density value) as correction target pixels. In each of the correction target pixels, the K (black) density value in the monochrome image data is corrected to a value equal to or higher than "85" which is the reference density value, by using a correction coefficient determined in advance, and the density in the monochrome image is increased to a density higher than the reference density.

Specifically, terms corresponding to the colors of RGB in the calculation formula (monochrome pixel value=0.3R+0.59G+0.11B) based on the NTSC standards used to obtain the monochrome pixel value (K (black) pixel value) in the monochrome conversion of the pixel values in the color image data are multiplied respectively by correction coefficients $\alpha 1$, $\alpha 2$, $\alpha 3$ (all of the coefficients are equal to or lower than 1, $\alpha 1 = \alpha 2 = \alpha 3$ may be satisfied) corresponding to the respective colors.

In this case, the values of the correction coefficients $\alpha 1$, $\alpha 2$, $\alpha 3$ for the respective terms are appropriately determined such that the K (black) density value before the correction obtained by subtracting, from "255," the monochrome pixel value simply calculated by using the aforementioned calculation formula is lower than the reference density value (for example, "85") is corrected to a corrected K (black) density value equal to or higher than the reference density value (for example, "85"), the corrected K (black) density value obtained by subtracting, from "255," the monochrome pixel value calculated by using the calculation formula in which the respective terms are multiplied by the correction coefficients $\alpha 1$, $\alpha 2$, $\alpha 3$.

Then, in the LUT 93a, for each of pixels of the pure colors in the color image data whose K (black) density values in the monochrome image data before the correction are lower than "85" being the reference density value, the corrected K (black) density value in the monochrome image data is calculated from the original RGB pixel values by using the calculation formula based on the NTSC standards in which the determined correction coefficients $\alpha 1$, $\alpha 2$, $\alpha 3$ are applied to the respective terms corresponding to the colors of RGB. The calculated corrected K (black) density value should be a value equal to or higher than "85" being the reference density value. This corrected density value is thus defined in the LUT 93a as the K (black) density value in the monochrome image data, in place of the density value before the correction.

Note that the contents of correction of the K (black) density value in the monochrome image data may be such that, for example, as illustrated in the table portion on the right of the arrow in the LUT 93a of FIG. 7, the K (black) density values of the correction target pixels which are lower than "85" being the reference density value are uniformly increased to "85" being the same value as the reference density value.

After the CPU 90 builds the LUT 93a in which the K (black) density value of each correction target pixel in the monochrome image data is redefined from the density value before the correction shown on the left of the arrow in FIG. 7 to the corrected density value shown on the right of the arrow as described above, the CPU 90 performs from here on the monochrome conversion by using this LUT 93a, the monochrome conversion being such that the RGB pixel values (part (1) in FIG. 7) of each pixel in the color image data to be printed in monochrome by the inkjet printer 1 are converted to the K (black) density value (part (2) in FIG. 7) in the monochrome image data.

The aforementioned correction (that is, obtaining of the corrected monochrome image data) can be thereby performed simultaneously with the monochrome conversion. Moreover, it is possible to improve the visibility in the monochrome image of colors such as, for example, Y (yellow) and C (cyan) in the color image whose densities fall below the reference density value due to the monochrome conversion, by increasing the densities corresponding to these colors in the monochrome image and expanding the reproduction range thereof.

With reference to FIGS. 10A to 10F, specific description is given of density change occurring in the monochrome image by changing the K (black) density value to the corrected density value, the K (black) density value being the K (black) density value in the monochrome image data corresponding to the pixel determined to be the correction target as a result of comparison with the reference density value, out of the K (black) density values in the monochrome image data corresponding to the pixels of the pure colors and defined in the LUT 93a.

FIGS. 10A to 10F are explanatory views illustrating changes up to the point where the CPU 90 of FIG. 1 corrects the K (black) density value in the monochrome image data, defined in the LUT 93a of FIG. 7 and corresponding to Y (yellow), to a density value equal to or higher than the reference density value, and the density corresponding to Y (yellow) is changed in the monochrome image to improve the visibility. Note that, in FIGS. 10A to 10F, there is extracted and illustrated a monochrome image data portion corresponding to colors belonging to the top layer of the color solid model of the color image data illustrated in the left portion of FIG. 2 whose vertices are respectively G (green), C (cyan), Y (yellow) and white.

Figure 10A:
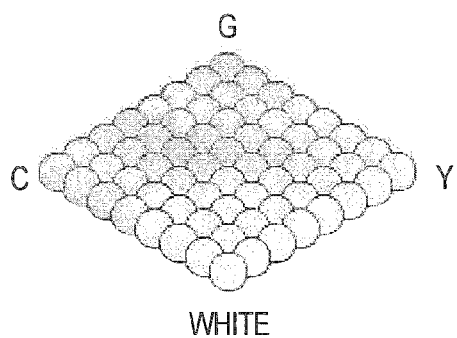
FIGS. 10A to 10F are explanatory views illustrating changes up to a point where the CPU in the control unit of FIG. 1 corrects the K (black) density value in the monochrome image data defined in the lookup table of FIG. 7 and corresponding to Y to a density value equal to or higher than the reference density value, and the density corresponding to Y is changed in the monochrome image.
Figure 10D:
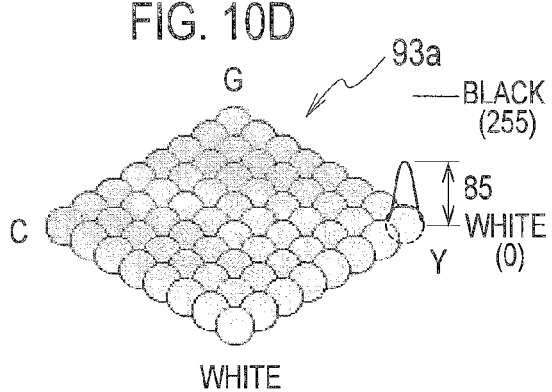
Figure 10B:
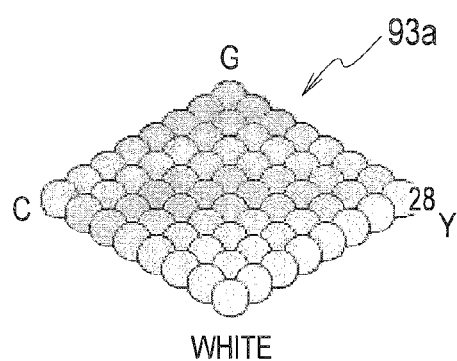

Focusing on the density in the monochrome image data corresponding to Y (yellow), as illustrated in FIG. 10A, the color information of the color image data is lost when the color image data is simply subjected to the monochrome conversion and the Gamma correction. Accordingly, the K (black) density value is a low value in a portion corresponding to Y (yellow) in the monochrome image data, and the monochrome image of this portion has low density and becomes less visible. As illustrated in FIG. 10B, the CPU 90 thus corrects the K (black) density value in the monochrome image data corresponding to Y (yellow) and defined in the LUT 93a.

Specifically, the CPU 90 performs correction of increasing the K (black) density value in the monochrome image data corresponding Y (yellow), from "28" defined in the LUT 93a to "85" being the reference density value. This correction is correction in which the K (black) density value of "28" in the monochrome image data which is close to white as illustrated in FIG. 10C is changed to the value of "85" which is closer to black as illustrated in FIG. 10D, and the density in the portion corresponding to Y (yellow) in the monochrome image is thereby increased. Then, after correcting the K (black) density value in the monochrome image data corresponding to Y (yellow), the CPU 90 changes the K (black) density value in the monochrome image data corresponding to Y (yellow) in the LUT 93a to the corrected value.

Figure 10E:
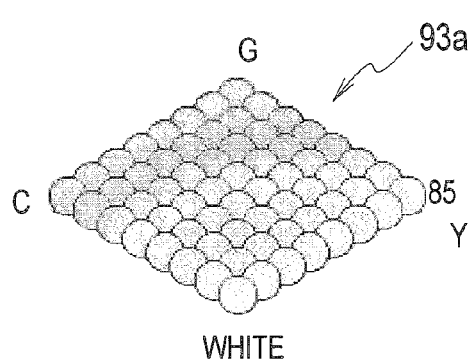
Figure 10C:
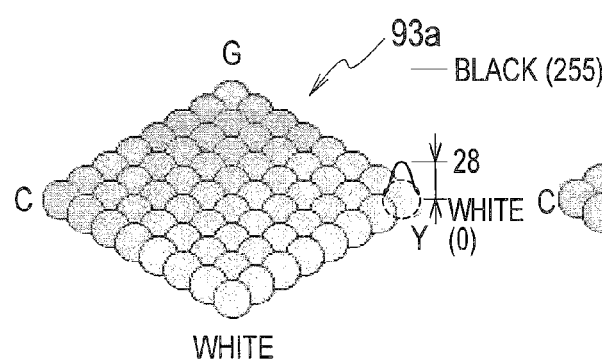

When the K (black) density value in the monochrome image data corresponding to Y (yellow) and defined in the LUT 93a is corrected as described above, the K (black) density value corresponding to Y (yellow) in the monochrome image data obtained by subjecting the color image data to the monochrome conversion using the LUT 93a changes from "28" before the correction illustrated in FIG. 10B to "85" after the correction illustrated in FIG. 10E.

Figure 10F:
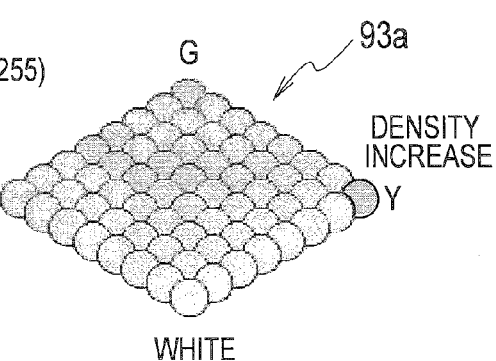

As illustrated in FIG. 10F, the density in the monochrome image corresponding to Y (yellow) is thereby set to the reference density higher than the density before the correction illustrated in FIG. 10A. Hence, the image portion corresponding to Y (yellow) in the monochrome image has a higher density than that before the correction and is easily recognizable. The visibility of the image portion corresponding Y (yellow) in the monochrome image is thus improved.

Contents of Correction Processing on Monochrome Image Data

Next, correction processing performed when the CPU 90 of FIG. 1 performs the monochrome conversion on the color image data is described with reference to the flowchart of FIG. 11.

First, the CPU 90 determines contents of correction to be performed for each pixel in the monochrome conversion of the color image data, from RGB dot image data (color image data) inputted from the client 14 or the scanner 101 (step S1). Then, the CPU 90 calculates the K (black) density value of each pixel in the monochrome image data subjected to the monochrome conversion while reflecting the determined correction contents (step S3).

After calculating the K (black) density value of each pixel in the mono chrome image data, the CPU 90 causes the printing unit 102 to print the monochrome image corresponding to the color image data on a not-illustrated print sheet by using the monochrome image data (step S5), and terminates the series of processes.

Figure 11:
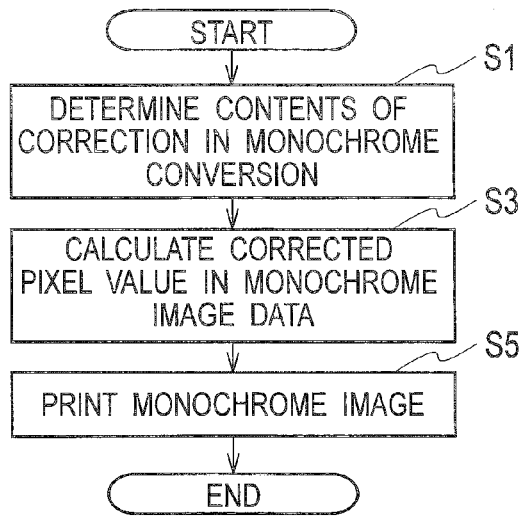
FIG. 11 is a flowchart illustrating steps of correction processing performed when the CPU in the control unit of FIG. 1 performs the monochrome conversion on the color image data.
Figure 12:
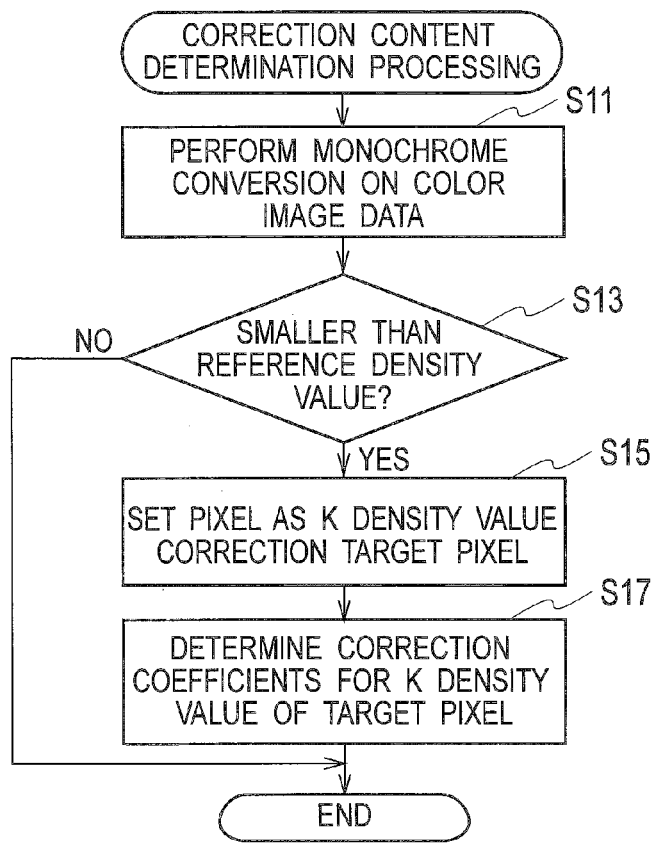
FIG. 12 is a flowchart illustrating details of the processing of step S1 in FIG. 11 in the case where the processing is performed by the CPU in the control unit of FIG. 1 configured to perform the monochrome conversion on the color image data by using the lookup table of FIG. 7.

Next, with reference to the flowchart of FIG. 12, description is given of details of the processing of step S1 in FIG. 11 in the case where the processing is performed by the CPU 90 configured to perform the monochrome conversion on the color image data by using the LUT 93a of FIG. 7.

First, the CPU 90 performs the monochrome conversion on the inputted color image data by using the LUT 93a (step S11), and compares the K (black) density value of each of pixels with the reference density value, the pixels being pixels which correspond to the pure colors in the color image data and which are included in the monochrome data subjected to the monochrome conversion (step S13). Then, the CPU 90 sets a pixel whose K (black) density value in the monochrome image data is lower than the reference density value as the K (black) density value correction target pixel (step S15). Furthermore, the CPU 90 determines the correction coefficients appropriate for setting the K (black) density value of the correction target pixel in the monochrome image data to a value equal to or higher than the reference density value (step S17).

Then the CPU 90 terminates the processing of step S1 in FIG. 11 and proceeds to the processing of step S3. In the processing of step S3, the CPU 90 corrects the K (black) density value in the monochrome image data which corresponds to the color of the correction target pixel out of the pixels of the pure colors in the color image data and which is defined in the LUT 93*a*, to the density value equal to or higher than the reference density value by using the correction coefficient determined in step S17 of FIG. 12, and calculates the corrected K (black) density value in the monochrome image data.

In the inkjet printer 1 of the embodiment, configured as described above, when the CPU 90 of the control unit 10 performs the monochrome conversion on the color image data, the CPU 90 performs correction such that, out of the pixels of the pure colors in the color image data, the pixels of color components which become less noticeable (less visible) in the monochrome image than in the color image due to the monochrome conversion are made more noticeable (more visible) by increasing the densities thereof.

The pixels which include colors such, as Y (yellow), C (cyan), and G (green) and which have low densities and becomes less visible due to the normal monochrome conversion as in the monochrome images illustrated in the explanatory views of FIGS. 4B and 5B can be thereby made more visible by increasing the densities thereof as illustrated in the monochrome images illustrated in the explanatory views of FIGS. 4C and 5C.

Particularly, in a picture in which many objects of natural colors including colors other than the pure colors are captured, limiting the colors (target colors) in the color image data to be the target of the correction of the K (black) density values in the monochrome image data subjected to the monochrome conversion to the pure colors (primary colors and secondary colors) can suppress image texture change in the monochrome image subjected to the monochrome conversion which is caused by the correction on the pixels corresponding to the target colors.

Meanwhile, in images such as letters and illustrations which are created by arbitrarily determining the colors, the visibility thereof in the monochrome image subjected to the monochrome conversion can be improved by the density change in the correction on the pixels corresponding to the target colors.

Modified Example in which Correction Processing of Monochrome Image Data is Performed through Computation In the embodiment, description is given of the configuration in which the CPU 90 of the control unit 10 obtains the K (black) density value in the monochrome image data obtained by subjecting the color image data to the monochrome conversion, by using the lookup table (LUT) 93*a* stored in the external storage 93.

However, the configuration may be such that the CPU 90 calculates the K (black) density value in the monochrome image data through computation. In this case, for example, the calculation formula (monochrome pixel value=0.3R+0.59G+0.11B) based on the NTSC standards is stored in the external storage 93, and the CPU 90 obtains the monochrome pixel value in the monochrome image data by plugging the pixel values of RGB in the color image data into the calculation formula in the external storage 93 and performing calculation of subtracting the obtained monochrome pixel value from "255." The CPU 90 can thereby obtain the K (black) density value before the correction in the monochrome image data through computation.

Then, the CPU 90 determines the corrected K (black) density value in the monochrome image data for, out of the pixels of the pure colors in the color image data, a pixel whose K (black) density value before the correction in the monochrome image data obtained through the computation is lower than "85" which is the reference density value determined in advance and stored in the external storage 93, such that the corrected density value is equal to or higher than "85". In this case, the CPU 90 may uniformly determine the corrected K (black) density values to be "85" being the reference density value, as described in the table portion on the right of the arrow in FIG. 7.

Alternatively, the CPU 90 may obtain the corrected K (black) density value through computation. In this case, the CPU 90 multiplies the terms corresponding to the respective colors in the calculation formula (monochrome pixel value=0.3R+0.59G+0.11B) based on the NTSC standards by the correction coefficients $\alpha 1$, $\alpha 2$, $\alpha 3$ (all of the coefficients are equal to or lower than 1, $\alpha 1 = \alpha 2 = \alpha 3$ may be satisfied) corresponding to the respective colors and determined in advance, and thereby calculates the monochrome pixel value (K (black) pixel value) of each correction target pixel out of the pixels of the pure colors in the color image data. Then the CPU 90 subtracts the calculated monochrome pixel value from "255" and obtains the corrected K (black) density value in the monochrome image data through computation.

Modified Example of Correction Target Color

Moreover, in the embodiment, only the pixels of pure colors (primary colors and secondary colors) in the color image data are included in the target of the correction in which the K (black) density value in the monochrome image data obtained by subtracting the K (black) pixel value (monochrome pixel value) after the monochrome conversion from "255" is increased to a value higher than the obtained density value and the density in the monochrome image is thereby increased. However, pixels of peripheral colors of the pure colors in the color image data may be included in the correction target.

Specifically, when the colors of correction target pixels are limited to the pure colors, in a portion in the monochrome image which becomes less visible after the monochrome conversion due to an insufficient density, the density is increased in a pin-point manner only for the pixels of the target colors which have been the pixels of pure colors before the monochrome conversion, For example, when G (green) is the only target color, only the reproduction range of G (green) in the color space of FIG. 6 is expanded at a degree far greater than the reproduction range of other hues (peripheral colors) adjacent to G (green).

When such correction is performed, the density of the pixel of the target color (pure color) is increased by the correction and decrease in visibility of this pixel due to insufficient density is eliminated. However, the density of the pixel of the peripheral color of the target color is not increased by the correction and decrease in visibility of this pixel due to insufficient density is not eliminated. Accordingly, in the case where the pixel of the target color and the pixel of the peripheral color thereof exist next to each other, the density difference between the pixel of the target color whose density is increased and the pixel of the peripheral color whose density is not increased becomes great, and the texture (quality) of the image may decrease.

Accordingly, the pixel of the peripheral color of the target color may also be included in the correction target. When the peripheral color pixel is also included in the correction target, the correction amount of the K (black) density value of the peripheral color pixel in the monochrome image data may be set such that the correction amount decreases from the correction amount of the K (black) density value of the target color in the monochrome image data as the color difference from the target color increases. This can reduce the possibility of occurrence of density unbalance between the pixel of the target color (pure color) and the pixel of the peripheral color in the monochrome image data due to the density change by the correction.

When the correction target is expanded to include not only the target color (pure color) but also the peripheral color thereof, the correction coefficients for correcting the K (black) density value in the monochrome image data are determined such that, in the pixel of the peripheral color in the color image data whose K (black) density value in the monochrome image data is lower than the reference density value, the density value is corrected to a value equal to or higher than the reference density value, based on the K (black) density value of the target color pixel in the monochrome image data. These correction coefficients are, for example, the correction coefficients $\alpha 1$, $\alpha 2$, $\alpha 3$ or the like for the terms corresponding to the respective colors of RGB in the calculation formula (monochrome pixel value=0.3R+0.59G+0.11B) based on the NTSC standards used to calculate the monochrome pixel values (K (black) pixel value) described in the aforementioned embodiment.

In this case, the reference density value used as a reference for determining whether a certain pixel is the pixel whose the K (black) density value in the monochrome image data is to be corrected varies between the target color (pure color) and the peripheral color. Specifically, the reference density value for the peripheral color is lower than the reference density value for the target color (pure color). To be more specific, when the K (black) density values are set to values equal to or higher than the reference density value by the correction, smooth density change between the correction target pixels and non-correction target pixels in the monochrome image cannot be achieved, unless the reference density value is made to vary in a distributed (for example, Gaussian-distributed) manner as illustrated in FIG. 3B and the reference density value of the peripheral color is set lower than the reference density value of the target color (pure color). Accordingly, the correction of increasing the density in the monochrome image is performed such that the density change with distribution (for example, Gaussian distribution) as illustrated in FIG. 3B is maintained among adjacent pixels in the monochrome image.

Moreover, a range of peripheral color to be included in the correction target may be experimentally determined after: correcting the K (black) density value in the monochrome image data which is lower than the reference density value with the peripheral color like one described above being included in the correction target; and checking changes in visibility of the monochrome image caused by the correction and effects of the density change between adjacent pixels after the correction.

When the correction coefficients are determined, the corrected K (black) density value is calculated by using the determined correction coefficients, for each of the pixels of the target color and the peripheral color thereof in the color image data whose K (black) density value in the monochrome image data is lower than the reference density value. Then, the calculated corrected K (black) density value is defined in the LUT 93a, in place of the K (black) density value before the correction.

Example of Method of Setting Correction Target Color and Correction Amount

Note that, when the pixel of the peripheral color of the target color is included in the correction target, the correction amount of the K (black) density value of the peripheral color pixel in the monochrome image data can be set such that the correction amount decreases from the correction amount of the K (black) density value for the target color in the monochrome image data as the color difference from the target color increases.

In this case, the correction amount for the peripheral color and the range of the peripheral color to be included in the correction target can be determined by, for example, using the Gaussian distribution curve (y=G(x)) illustrated by the dotted line in FIG. 3A. Specifically, as illustrated in an enlarged manner in FIG. 3B, it is possible to determine the range of the peripheral color to be included in the correction target from the distribution range of the Gaussian distribution curve in which the correction amount for the target color is set as a peak value at the center of the Gaussian distribution curve in FIG. 3B in the distribution direction thereof. Moreover, it is possible to determine the correction amount for the peripheral color from a distribution value at each distribution position, the correction amount for the peripheral color set to decrease from the correction amount for the target color as the color difference from the target color increases.

The case where the target color and the peripheral color thereof are defined by the position of the distribution center and the distribution range of the Gaussian distribution curve (y=G(x)) in the horizontal axis direction of FIG. 3B is described as a specific example. In this case, Y (yellow) which corresponds to a K (black) density value Yx0 in the monochrome data at the center of the Gaussian distribution curve (y=G(x)) in the distribution direction thereof is the target color whose K (black) density value in the monochrome image data is to be corrected. Moreover, a range whose center is the density value Yx0 and which spreads from Yx0−x2 to Yx0+x2 (note that the density value Yx0 is excluded) defines the range of the peripheral color of Y (yellow) in the color space whose K (black) density value in the monochrome image data is to be corrected together with Y (yellow).

The aforementioned range from the K (black) density value Yx0−x2 to the K (black) density value Yx0+x2 (note that the density value Yx0 is excluded) in the monochrome image data which corresponds to the peripheral color of Y (yellow) is divided into two regions at the density values Yx0−x1 and Yx0+x1 (note that |x1|<|x2|). Out of the divided regions, a region from the density value Yx0−x1 to the density value Yx0+x1 corresponding to the peripheral color close to Y (yellow) being the target color is referred to as region A. Meanwhile, a region from the density value Yx0+x1 to the density value Yx0+x2 and a region from the density value Yx0−x1 to the density value Yx0−x2 which correspond to the peripheral color more different from Y (yellow) being the target color than the peripheral color of the region A are collectively referred to as region B.

Then, the correction coefficients $\alpha 1$, $\alpha 2$, $\alpha 3$ which are applied to the calculation formula (monochrome pixel value=0.3R+0.59G+0.11B) based on the NTSC standards used to calculate the monochrome pixel value (K (black) pixel value) from the pixel values of the color image data and by which the terms corresponding RGB are multiplied are determined for each of the peripheral color close to Y (yellow) corresponding to the region A and the peripheral color not close to Y (yellow) corresponding to the region B.

Note that the values of the correction, coefficients α1, α2, α3 for the region A, that is the correction coefficients α1, α2, α3 for the peripheral color close to Y (yellow) are determined to be lower than the values of the correction coefficients α1, α2, α3 for Y (yellow). Moreover, the values of the correction, coefficients α1, α2, α3 for the region B, that is the correction coefficients α1, α2, α3 for the peripheral color not close to Y (yellow) are determined to be even lower than the values of the correction coefficients α1, α2, α3 for the peripheral color close to Y (yellow).

Then, the corrected K (black) density values in the monochrome image data corresponding to the peripheral colors of Y (yellow) are calculated from the pixel values of RGB in the color image data corresponding to the regions A, B, by using the calculation formula based on the NTSC standards in which the terms of RGB are multiplied by the correction coefficients α1, α2, α3 for the regions A and B, and are defined in the LUT 93a, in place of the K (black) density values before the correction.

Due to this, in the pixel using Y (yellow) being the target color in the color image which becomes less visible in the monochrome image subjected to the monochrome conversion, the K (black) density value in the monochrome image data is increased by the correction and the density is increased. Accordingly, the pixel is easily recognizable in the monochrome image.

Moreover, in the pixels using the peripheral colors of Y in the color image, the K (black) density values in the monochrome image data are increased by the correction by correction amounts lower than the correction amount for the pixel using Y (yellow) in the color image, such that the closer the color is to Y (yellow), the greater the correction amount is.

Hence, as the color difference between the peripheral color and Y (yellow) decreases, the density of the pixel in the monochrome image which corresponds to the peripheral color of Y (yellow) in the color image increases and becomes closer to the density of the pixel in the monochrome image which corresponds to Y (yellow) in the color image. Hence, it is possible to prevent occurrence of large density difference in the monochrome image between the pixel corresponding to Y (yellow) in the color image and the pixel corresponding to the peripheral color of Y (yellow) in the color image.

Modified Example of LUT

In the aforementioned embodiment, the method of converting the color image data into the monochrome data by using the RGB pixel values weighted based on the NTSC standards is used as the method of the monochrome conversion of the color image data. Hence, the above-described LUT 93a used in the monochrome conversion of the color image data is a LUT configured in consideration of use of the monochrome data conversion method based on the NTSC standards. However, when the method of the monochrome conversion of the color image data is different from that described above, the configuration of the LUT used for the monochrome conversion of the color image data may be changed to a configuration suitable for the different method.

As another example of the case where the CPU 90 uses the LUT for the monochrome conversion of the color image data, description is given below of the case where the CPU 90 converts the pixel values of each pixel in the color image data to the monochrome data by using a lightness (L) component obtained by developing RGB components to a color solid of lightness (L) and of hue and chroma (a, b) being color components.

A LUT 93b (see FIG. 1) in the embodiment is a profile data including a table in which values of chroma (a, b) in the Lab color solid are associated with the monochrome pixel values in the monochrome image data determined from values of lightness (L) in the Lab color solid. Accordingly, the LUT 93b in the embodiment includes, for the respective values of lightness (L), multiple tables in which the values of the chroma (a, b) and the monochrome pixel values are associated with one another.

Figure 13:
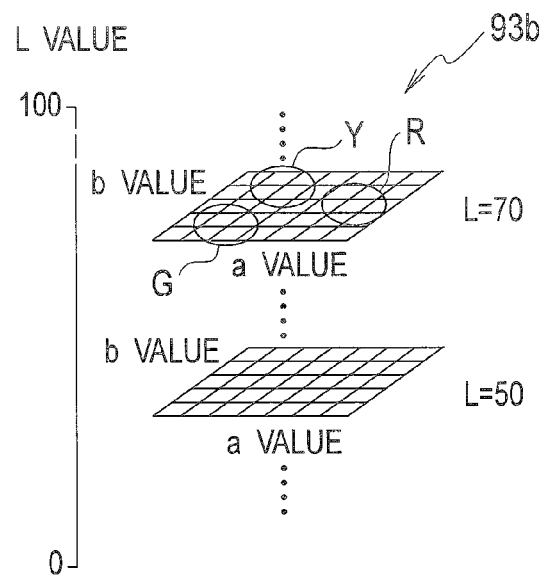
FIG. 13 is an explanatory view illustrating the contents of the lookup table stored in the external storage of the control unit in an inkjet printer in another embodiment.

FIG. 13 is an explanatory view illustrating the contents of the LUT 93b in the embodiment. As illustrated in FIG. 13, the LUT 93b of the embodiment has the multiple tables for the respective values of lightness (L) in each of which the values of chroma (a, b) are arranged along a horizontal axis and a vertical axis and the K (black) density value after the monochrome conversion is assigned to each of squares being intersections of a and b.

The LUT 93b is the same as the LUT 93a in FIG. 7 described in the aforementioned embodiment in terms of defining the K (black) density value in the monochrome data corresponding to the color image data. Accordingly, the K (black) reference density value in the monochrome image data for the pixels of the pure colors in the color image data is determined in a way similar to that in the LUT 93a of FIG. 7. Then, when the density value lower than the determined reference density value is defined in the LUT 93b as the K (black) density value in the monochrome image data corresponding to the pixel of the pure color (primary color or secondary color) in the color image data, the K (black) density value of this pixel is corrected to a density value equal to or higher than the reference density value.

Specifically, also in this embodiment, it is possible to determine the correction coefficients by which the K (black) density value corresponding to the target color in the monochrome image data subjected to the monochrome conversion is set to a value equal to or higher than the reference density value, correct the K (black) density value before the correction corresponding to the target color in the LUT 93b by applying the determined correction coefficients to the calculation formula based on the NTSC standards, and define the corrected K (black) density value in the LUT 93b in place of the K (black) density value before the correction.

As described above, after the CPU 90 builds the LUT 93b in which, for each of the pixels of the pure colors being the correction target whose K (black) density values after the monochrome conversion are lower than the reference density value, the K (black) density value is redefined to the K (black) density value corrected to be equal to or higher than the reference density value, the CPU 90 performs from here on the monochrome conversion by using this LUT 93b, the monochrome conversion being such that the RGB pixel values of each pixel in the color image data to be printed in monochrome in the inkjet printer 1 are converted to the K (black) density value in the monochrome image data.

The aforementioned correction can be thereby performed simultaneously with the monochrome conversion. Moreover, it is possible to improve the visibility in the monochrome image for pure colors such as, for example, Y (yellow) and C (cyan) in the color image whose K (black) density values fall below the reference density value due to the monochrome conversion, by increasing the densities corresponding to these colors in the monochrome image and expanding the reproduction range thereof.

When the pure color and the peripheral color thereof are included in the correction target, the K (black) density value before the correction is corrected for each of the pixels which correspond to the pixels of the pure color and the peripheral color in the color image and whose K (black) density values in the monochrome image are lower than the reference density value in one of the tables for the respective values of lightness (L), by using the correction coefficients determined such that the K (black) density values of these pixels become equal to or higher than the reference density value, and the K (black) density values of these pixels are thereby each increased to a value equal to or higher than the reference density value. Also in this case, the correction coefficients for the peripheral color and the range of the peripheral color to be included in the correction target can be determined by using, for example, the Gaussian distribution curve (y=G(x)) illustrated by the dotted line in FIG. 3A.

Then, the K (black) density values of the determined target color (a square at the center of the region surrounded by a circular frame in FIG. 13) and the peripheral color of the target color (squares in the region surrounded by the circular frame in FIG. 13 except for the square at the center) in the monochrome image data are increased according to the determined correction coefficients. The LUT 93b reflecting the contents of the correction is built by performing this processing for all of the tables for the respective values of lightness (L) which are included in the LUT 93b.

After building the LUT 93b as described above, the CPU 90 from, here on obtains the K (black) density value in the monochrome image data in the following way: determining the lightness (L) and the chroma (a, b) of each pixel in the color image data from the RGB pixel values of the pixel; finding a square corresponding to the chroma (a, b) from the table in the LUT 93b corresponding to the determined lightness (L); and obtaining the K (black) density value of the found square. The densities of the pixels of the target color and the peripheral color of the target color in the color image data are thereby increased after the monochrome conversion, and decrease in visibility due to the monochrome conversion is suppressed.

The CPU 90 of FIG. 1 performs the correction processing illustrated in the flowchart of FIG. 11 also when the monochrome conversion of the color image data is performed by using the LUT 93b of the embodiment which is configured as described above.

Figure 14:
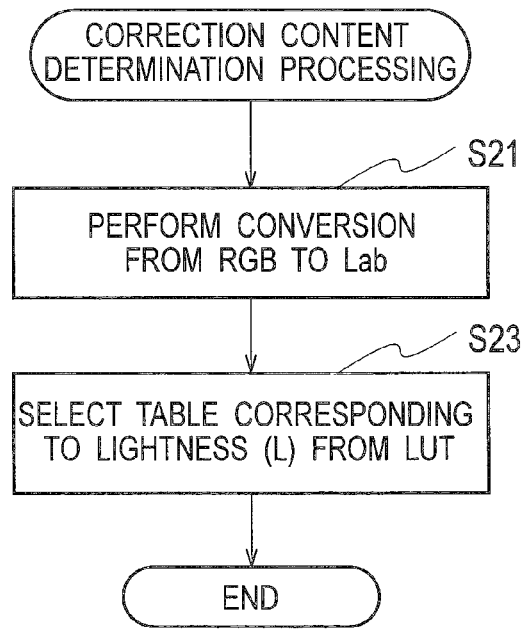
FIG. 14 is a flowchart illustrating details of the processing of step S1 in FIG. 11 in the case where the processing is performed by the CPU in the control unit of FIG. 1 configured to perform the monochrome conversion on the color image data by using the lookup table of FIG. 13.

In the case of performing the processing of step S1 in FIG. 11, the CPU 90 first performs conversion of the inputted color image data for each pixel such that values in the RGB color display system are converted to values in the Lab color display system, as illustrated in the flowchart of FIG. 14 (step S21). Next, the CPU 90 selects a table corresponding to the lightness (L) obtained by the conversion, from the LUT 93a (step S23).

Then the CPU 90 terminates the processing of step S1 in FIG. 11 and proceeds to the processing of step S3. In the processing of step S3, the CPU 90 obtains the K (black) density value in the monochrome image data which is set for a square corresponding to the chroma (a, b) obtained by the conversion in step S21 in the table selected in step S23 of FIG. 14, as the K (black) density value in the monochrome image data for the color (target color or peripheral color) corresponding to the aforementioned lightness (L) and the chroma (a, b) and subjected to the monochrome conversion.

Also in the embodiment in which the CPU 90 of the control unit 10 uses the LUT 93b configured as described above for the monochrome conversion of the color image data, it is possible to obtain effects similar to those obtained in the embodiment in which the CPU 90 of the control unit 10 uses the LUT 93a described above for the monochrome conversion of the color image data.

Note that the embodiment using the LUT 93b described above may also be configured such that the calculation formula for calculating the monochrome pixel value corresponding to the chroma (a, b) from the lightness (L) obtained by developing the RGB pixel values to the Lab color solid is stored in the external storage 93 in place of the LUT 93b, and the CPU 90 uses this calculation formula to perform the monochrome conversion on the color image data through computation.

Among these, in the case where the LUT 93a of FIG. 7 is used for the monochrome conversion of the color image data, it is only necessary for the CPU 90 to determine the correction coefficients α1, α2, α3 for the terms corresponding the respective colors in the calculation formula based on the NTSC standards from the correction coefficients determined in step S17 of FIG. 12, and perform computation of the calculation formula by plugging the pixel values of RGB in the color image data into the calculation formula based on the NTSC standards.

Meanwhile, in the case where the LUT 93b of FIG. 13 is used for the monochrome conversion of the color image data, it is only necessary for the CPU 90 to obtain the lightness (L) and the chroma (a, b) from the RGB pixel values in the color image data through computation, further obtain the K (black) density value in the monochrome image data from the lightness (L) through computation, and calculate the corrected K (black) density value in the monochrome image data from the obtained K (black) density value and the correction coefficients determined in step S17 of FIG. 12.

Modified Example of Determining Correction Amount (Correction Ratio) depending on Image Rate of Correction Target Color The correction coefficients for the target color may be varied depending on an image rate of the target color in the color image. Moreover, the correction coefficients for the peripheral color and the range of the peripheral color to be included in the correction target may also be varied depending on the image rate of the target color in the color image.

In this case, the image rate is used to evaluate the degree of existence of an image portion of the target color in the color image in a numerical value, and a coverage rate and an image percentage can be given as specific examples of the image rate. The coverage rate is a proportion of an actual value to a calculated value of a maximum ink amount per page (number of pixels per page×maximum ink amount per pixel), and the image percentage is a proportion of the number of pixels in which printing of ink is actually performed to the total number of pixels per page.

For example, when the pixel values for an ink of the correction target color and an ink of the peripheral color of the target color exist (pixel value is not 0) in 20 pixels out of 10×10 =100 pixels existing in one page in the color image data, the image percentage per page for this ink color is (20/100)=20%.

Moreover, assume a case where: the printing unit 102 can print five drops of ink at a maximum for each of 10×10=100 pixels; there are 20 pixels in each of which the ink amount calculated from the pixels values for the ink of the correction target color and the ink of the peripheral color of the target pixel is any of one to five drops; and the total ink amount in the 20 pixels is 40 drops. In this case, the coverage rate per page for this ink color is (40/500)=8% which is obtained by dividing the 40 drops actually used in the printing of this page by the maximum number of drops per page=10 (pixels)×10 (pixels)×5 (drops)=500.

Any evaluation value which evaluates the degree of existence of an image portion of the target color in the color image in numerical number based on other standards can be used as the image rate instead of the coverage rate and the image percentage for each page obtained as described above. When the correction coefficients for the target color are determined depending on the obtained image rate per page of the target color, the LUT 93a of FIG. 7 in which the K (black) density values in the monochrome image data obtained from the calculation formula based on the NTSC standards are associated with the pixels values of RGB in the color image data and the LUT 93b of FIG. 13 in which the K (black) density values in the monochrome image data subjected to the monochrome conversion are associated with the chroma (a, b) are provided for each of image rates.

Moreover, the CPU 90 obtains the image rate of the target color in the color image data to be subjected to monochrome conversion for each page, and uses the LUT 93a, 93b corresponding to the image rate of the target color in each page to perform the monochrome conversion. Specifically, the CPU 90 determines the correction amount of the K (black) density value in the monochrome image data obtained by subjecting the pixel value of the target color in the color image data to the monochrome conversion, depending on the image rate of the target color in each page in the color image data before the monochrome conversion.

Selecting the LUT 93a, 93b to be used in the monochrome conversion of the color image data depending on the image rate of the target color in each page makes it possible to perform the monochrome conversion such that, as the image rate of the target color increases, a table with higher correction coefficients for the target color is used. Accordingly, as the image rate of the target color increases, the effect of the correction which is improvement in visibility by increasing the density can be exerted more significantly.

Note that, when the correction amount of the K (black) density value in the monochrome image data obtained by subjecting the pixel value of the target color in the color image data to the monochrome conversion is determined depending on the image rate of the target color in each page in the color image data before the monochrome conversion, the correction coefficients for the peripheral color corresponding to the correction coefficients for the target color and the range of the peripheral color to be included in the correction target can be also determined depending on the image rate of the target color in each page in the color image data before the monochrome conversion.

Figure 15:
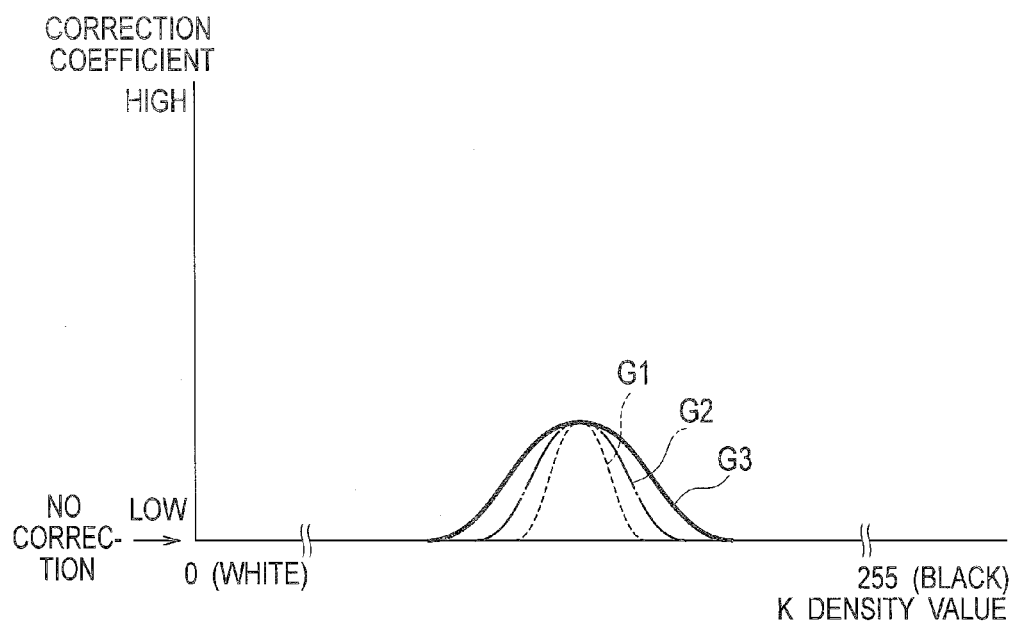
FIG. 15 is graph illustrating multiple Gaussian distribution curves which are selected and used to determine correction coefficients for pixel values of a target color and a peripheral color and a range of the peripheral color to be included in a correction target, in the correction performed by the CPU in the control unit of FIG. 1 on the monochrome image data subjected to the Gamma correction.

For example, when the correction coefficients for the peripheral color corresponding to the correction coefficients for the target color and the range of the peripheral color to be included in the correction target are to be determined by using a Gaussian distribution curve like one illustrated in FIG. 3B as described above, the Gaussian distribution curve to be applied depending on the image rate of the target color in each page can be determined from one of multiple Gaussian distribution curves G1 to G3 illustrated in the graph of FIG. 15 (FIG. 15 illustrates a case where the Gaussian distribution curve is selected from three types of curves) depending on the obtained image rate.

In this case, the correction coefficients for the peripheral color corresponding to the correction coefficients for the target color and the range of the peripheral color to be included in the correction target are determined from a shape obtained by combining the Gaussian distribution curve to be applied and the characteristic after the Gamma correction illustrated by the two-dot chain line in FIG. 3A with the peak portion of the Gaussian distribution curve aligned with a pixel value portion of the target color on the characteristic.

Then the pixel values of the determined target color (in the case of the LUT 93b in FIG. 13, the square at the center of the region surrounded by the circular frame in FIG. 13) and peripheral color of the target color (in the case of the LUT 93b in FIG. 13, the squares in the region surrounded by the circular frame in FIG. 13 except for the square at the center) are increased according to the correction coefficients determined according to the characteristic obtained by combining the Gaussian distribution curve selected from the multiple Gaussian distribution curves G1 to G3 in FIG. 15 and the characteristic after the Gamma correction in FIG. 3A.

Note that, also when the CPU 90 performs the correction of expanding the reproduction width of the target color in the monochrome image through computation, the correction coefficients for the target color can be determined depending on the image rate of the target color in the color image as in the case where the CPU 90 performs the correction by using the LUT 93a. Moreover, the correction coefficients for the peripheral color and the range of the peripheral color to be included in the correction target can be determined depending on the image rate of the target color in the color image.

Moreover, the CPU 90 may perform, the monochrome conversion on the color image data through computation also when the correction amount of the monochrome image pixel obtained by subjecting the pixel values of the target color to the monochrome conversion and the Gamma correction and the range of the peripheral color to be included in the correction target are determined depending on the image rate of the target color in each page in the color image data before the monochrome conversion.

Figure 16:
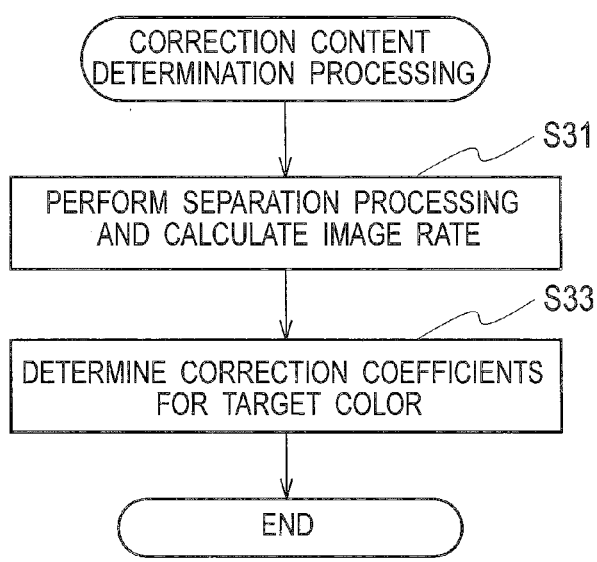
FIG. 16 is a flowchart illustrating details of the processing of step S1 in FIG. 11 in the case where the processing is performed by the CPU in the control unit of FIG. 1 configured to perform the monochrome conversion on the color image data through computation.

Next, with reference to the flowchart of FIG. 16, description is given of details of the processing of step S1 in FIG. 11 in the case where the processing is performed by the CPU 90 configured perform the monochrome conversion on the color image data through computation.

First, the CPU 90 performs separation processing on the inputted color image data to obtain pixel values of each target color (pure color) to be the target of correction of density in the monochrome image, and then obtains the image rate of the target color in each page from the pixel values of the target color (step S31). Then the CPU 90 determines the correction coefficients for the target color (as well as the correction coefficients for the peripheral color and the range of the peripheral color to be included in the correction target) from the obtained image rate of the target color in each page (step S33).

Then the CPU 90 terminates the processing of step S1 in FIG. 11 and proceeds to the processing of step S3. In the processing of step S3, the CPU 90 multiplies the correction coefficients determined in step S33 in FIG. 16 by weighting coefficients for the target color corresponding to the correction coefficients in the calculation formula used when the monochrome conversion of the color image data is performed through computation. Then the CPU 90 calculates the K (black) density value in the monochrome data corresponding to the target color from the pixel values of each color subjected to the separation processing in step S31, by using the calculation formula in which the correction coefficients are multiplied by the weighting coefficients.

Note that, when the correction coefficients for the peripheral color and the range of the peripheral color to be included in the correction target are also determined in step S33 of FIG. 16, the CPU 90 multiplies the determined correction coefficients for the peripheral color by weighting coefficients for the peripheral color corresponding to the correction coefficients in the calculation formula used when the monochrome conversion of the color image data is performed through computation. Then the CPU 90 calculates the K (black) density value in the monochrome data corresponding to the peripheral color from the pixel values of each color subjected to the separation processing in step S31, by using the calculation formula in which the correction coefficients are multiplied by the weighting coefficients.

Modified Example in which Density Correction of Monochrome Image Data is Performed in Client Description is given above of the embodiment in which the image processing apparatus according to the embodiment is provided in the control unit 10 of the inkjet printer 1. However, the image processing apparatus in the embodiment can be provided in the printer driver 110 built in the CPU 16 of the client 14.

In this case, when the printer driver 110 receives, from the input unit 19, the print request of performing monochrome printing of the color original data generated by the application program stored in the external storage 21, the printer driver 110 performs color conversion and converts the RGB image data of the original image to the monochrome image data by using a general monochrome conversion method as performed by the CPU 90 of the control unit 10 of the ink jet printer 1 in the aforementioned embodiment.

In this case, the printer driver 110 performs the processing described with reference to FIGS. 11, 12, 14, and 16 on the color image data related to the print request as performed by the CPU 90 of the control unit 10 of the inkjet printer 1 in the aforementioned embodiments . Furthermore, the printer driver 110 performs correction on the monochrome image data subjected to the monochrome conversion such that the reproduction width of the pixel corresponding to the target color (and the peripheral color) in the monochrome image is expanded. Then the printer driver 110 outputs the print job including the corrected monochrome image data to the control unit 10 of the inkjet printer 1.

In such a configuration, effects similar to those in the aforementioned embodiments can be also obtained in the original image printed in monochrome by the printing unit 102 of the inkjet printer 1 based on the print job.

Note that, when the printer driver 110 uses the LUT 93*a*, 93*b* in FIGS. 7 and 13 in the monochrome conversion of the color original data, the LUT 93*a*, 93*b* are provided in the RAM 18 of the client 14.

Modified Example in which Reference Density Value is set Individually for each Target Color In the embodiment described above, the CPU 90 uses the reference density value (for example "85") common to all colors, regardless of the original color in the color image data before the monochrome conversion, to determine whether a certain pixel is the pixel being the target of the correction of increasing the K (black) density value in the monochrome image data subjected to the monochrome conversion.

However, the CPU 90 may use the reference density value which varies depending on the original color in the color image data before the monochrome conversion to determine whether a certain pixel is the pixel being the target of the correction of increasing the K (black) density value in the monochrome image data subjected to the monochrome conversion. Note that, in the embodiment, description of the same configurations and processing as those in the aforementioned embodiment is omitted.

For example, Y (yellow) and C (cyan) have a common characteristic that image portions of these colors have insufficient densities due to the monochrome conversion and are less visible in the monochrome image. However, in the monochrome image data subjected to the monochrome conversion, the K (black) density value corresponding to Y (yellow) having relatively high lightness, that is relatively low density is "28," while the K (black) density value corresponding to C (cyan) having relatively low lightness, that is relatively high density, is "77."

The reference density values can be thus set as follows. For the pixel whose original color in the color image data before the monochrome conversion is Y (yellow), the reference density value is set to "40" which is higher than "28" being the K (black) density value in the monochrome image data subjected to the monochrome conversion. Meanwhile, for the pixel whose original color is C (cyan), the reference density value is set to "95" which is higher than "77" being the K (black) density value in the monochrome image data subjected to the monochrome conversion. Note that the reference density value for Y (yellow) is set lower than the reference density value for C (cyan) because the density of C (cyan) is originally lower than the density of Y (yellow) and there is no need to increase the reference density value of Y (yellow) as much as the reference density value of C (cyan).

Figure 17:
FIG. 17 is an explanatory view illustrating examples of the corrected K (black) density values in the monochrome image data which are defined in the lookup table of FIG. 7 in the case where the reference density value is set for each ink color.

Then, the following processing is performed when the reference density value for Y (yellow) is set to "40" and the reference density value for C (cyan) is set to "95" as described above. As shown in the K (black) density values in the monochrome image data before and after the correction which are depicted in the table portions on the left and right of the arrow in the LUT 93*a* illustrated in FIG. 17, in the pixel whose original color in the color image data is Y (yellow), since the density value is "28" and is lower than "40" being the reference density value for Y (yellow), the density value is increased in the correction to "40" being the same value as the reference density value. Meanwhile, in the pixel whose original color in the color image data is C (cyan), since the density value is "77" and is lower than "95" being the reference density value for C (cyan), the density value is increased in the correction to "95" being the same value as the reference density value.

Accordingly, in the pixel whose original color in the color image data is Y (yellow) and the pixel whose original color in the color image data is C (cyan), variations corresponding to variations in the K (black) density values of these pixels in the monochrome image data before the correction also occurs in the corrected K (black) density values. Hence, when the correction of increasing the densities of image portions difficult to recognize in the monochrome image is performed, a difference in appearance depending on lightness and the like of the original colors in the color image before the monochrome conversion can be easily reproduced in the monochrome image.

Also in this modified example, the correction of increasing the density in the monochrome image can be performed not only for the target color but also for the peripheral color thereof in a way similar to that described in the aforementioned embodiment.

Moreover, although Y (yellow) and C (cyan) are given as examples of the target colors in the embodiment and modified examples described above, depending on the combination of inks and a print sheet, it is possible perform, for the other pure colors, the correction of increasing the K (black) density values in the monochrome image data by using the reference density value corresponding to these colors and perform the density increasing correction in the monochrome image.

Furthermore, although the inkjet printer 1 is given as an example of the apparatus configured to the monochrome image in the embodiment and modified examples described above, the present invention can be also applied to the case where a printing apparatus which uses a method other than the inkjet method such as an electrophotography method prints the monochrome image.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image processing apparatus comprising:
   a processor; and
   a memory including instructions that, when executed by the processor, cause the processor to perform operations including:
   when a density value of a black component in uncorrected monochrome image data corresponding to each of pure colors including primary colors and secondary colors in color image data is lower than a reference density value, the uncorrected monochrome image data being obtained by a monochrome conversion from the color image data including pixel values of respective color components for each pixel to monochrome image data including a density value of a black component for each pixel, determining a correction content for correcting the density value of the black component in the uncorrected monochrome image data corresponding to at least each of the pure colors out of the pure colors and peripheral colors of the pure colors in a color space to a value equal to or higher than the reference density value; and
   obtaining corrected monochrome image data in which correction based on the determined correction content is reflected in the uncorrected monochrome image data.

2. The image processing apparatus according to claim 1, wherein
   the reference density value is provided for each of the pure colors, and
   the operation includes, when the density value of the black component in the uncorrected monochrome image data corresponding to each of the pure colors is lower than the reference density value corresponding to each of the pure colors, determining the correction content for correcting the density value of the black component in the uncorrected monochrome image data corresponding to each of the pure colors to the value equal to or higher than the reference density value corresponding to each of the pure colors.

3. The image processing apparatus according to claim 1, further comprising a storage storing profile data in which the pixel values of the colors in the color image data are associated with density values of the black component determined based on the determined correction content,
   wherein the operation includes performing the monochrome conversion and obtaining the corrected monochrome image data simultaneously by using the profile data stored in the storage.

4. The image processing apparatus according to claim 2, further comprising a storage storing profile data in which the pixel values of the colors in the color image data are associated with density values of the black component determined based on the determined correction content,
   wherein the operation includes performing the monochrome conversion and obtaining the corrected monochrome image data simultaneously by using the profile data stored in the storage.

5. The image processing apparatus according to claim 1, wherein the operation includes calculating the density value of the black component in the corrected monochrome image data from the pixel values of the respective color components in the color image data based on the determined correction content.

6. The image processing apparatus according to claim 2, wherein the operation includes calculating the density value of the black component in the corrected monochrome image data from the pixel values of the respective color components in the color image data based on the determined correction content.

7. The image processing apparatus according to claim 1, wherein the operation further includes:
   calculating, for image data of each of pages included in the color image data, an image rate determined based on the pixel values of at least each of the pure colors out of the pure colors and the peripheral colors; and
   when the density value of the black component in the uncorrected monochrome image data corresponding to each of the pure colors is lower than the reference density value, determining, as the correction content, a correction rate of the density value of the black component in the uncorrected monochrome image data corresponding to each of the pure colors, for the image data of each of the pages, based on at least the calculated image rate for each of the pure colors in each of the pages.

8. The image processing apparatus according to claim 2, wherein the operation further includes:
   calculating, for image data of each of pages included in the color image data, an image rate determined based on the pixel values of at least each of the pure colors out of the pure colors and the peripheral colors; and
   when the density value of the black component in the uncorrected monochrome image data corresponding to each of the pure colors is lower than the reference density value, determining, as the correction content, a correction rate of the density value of the black component in the uncorrected monochrome image data corresponding to each of the pure colors, for the image data of each of the pages, based on at least the calculated image rate for each of the pure colors in each of the pages.

9. The image processing apparatus according to claim 7, wherein the operation further includes, when the density value of the black component in the uncorrected monochrome image data corresponding to each of the pure colors is lower than the reference density value, determining at least one of a range of the peripheral color to be included in a correction target and a correction rate of the density value of the black component in the uncorrected monochrome image data corresponding to the peripheral color based on at least the calculated image rate for each of the pure colors, and determining the correction content for the image data of each of the pages.

10. An image forming apparatus comprising:
- an image processing apparatus comprising:
  - a processor; and
  - a memory including instructions that, when executed by the processor, cause the processor to perform operations including
    - when a density value of a black component in uncorrected monochrome image data corresponding to each of pure colors including primary colors and secondary colors in color image data is lower than a reference density value, the uncorrected monochrome image data being obtained by a monochrome conversion from the color image data including pixel values of respective color components for each pixel to monochrome image data including a density value of a black component for each pixel, determining a correction content for correcting the density value of the black component in the uncorrected monochrome image data corresponding to at least each of the pure colors out of the pure colors and peripheral colors of the pure colors in a color space to a value equal to or higher than the reference density value, and
    - obtaining corrected monochrome image data in which correction based on the determined correction content is reflected in the uncorrected monochrome image data;
- a printing unit; and
- a controller configured to drive the printing unit to print a monochrome image by using the corrected monochrome image data obtained by the image processing apparatus.

11. The image forming apparatus according to claim 10, wherein
the reference density value is provided for each of the pure colors, and
the operation includes, when the density value of the black component in the uncorrected monochrome image data corresponding to each of the pure colors is lower than the reference density value corresponding to each of the pure colors, determining the correction content for correcting the density value of the black component in the uncorrected monochrome image data corresponding to each of the pure colors to the value equal to or higher than the reference density value corresponding to each of the pure colors.

12. The image forming apparatus according to claim 10, further comprising a storage storing profile data in which the pixel values of the colors in the color image data are associated with density values of the black component determined based on the determined correction content,
wherein the operation includes performing the monochrome conversion and obtaining the corrected monochrome image data simultaneously by using the profile data stored in the storage.

13. The image forming apparatus according to claim 11, further comprising a storage storing profile data in which the pixel values of the colors in the color image data are associated with density values of the black component determined based on the determined correction content,
wherein the operation includes performing the monochrome conversion and obtaining the corrected monochrome image data simultaneously by using the profile data stored in the storage.

14. The image forming apparatus according to claim 10, wherein the operation includes calculating the density value of the black component in the corrected monochrome image data from the pixel values of the respective color components in the color image data based on the determined correction content.

15. The image forming apparatus according to claim 11, wherein the operation includes calculating the density value of the black component in the corrected monochrome image data from the pixel values of the respective color components in the color image data based on the determined correction content.

16. The image forming apparatus according to claim 10, wherein the operation further includes:
- calculating, for image data of each of pages included in the color image data, an image rate determined based on the pixel values of at least each of the pure colors out of the pure colors and the peripheral colors; and
- when the density value of the black component in the uncorrected monochrome image data corresponding to each of the pure colors is lower than the reference density value, determining, as the correction content, a correction rate of the density value of the black component in the uncorrected monochrome image data corresponding to each of the pure colors, for the image data of each of the pages, based on at least the calculated image rate for each of the pure colors in each of the pages.

17. The image forming apparatus according to claim 11, wherein the operation further includes:
- calculating, for image data of each of pages included in the color image data, an image rate determined based on the pixel values of at least each of the pure colors out of the pure colors and the peripheral colors; and
- when the density value of the black component in the uncorrected monochrome image data corresponding to each of the pure colors is lower than the reference density value, determining, as the correction content, a correction rate of the density value of the black component in the uncorrected monochrome image data corresponding to each of the pure colors, for the image data of each of the pages, based on at least the calculated image rate for each of the pure colors in each of the pages.

18. The image forming apparatus according to claim 16, wherein the operation further includes, when the density value of the black component in the uncorrected monochrome image data corresponding to each of the pure colors is lower than the reference density value, determining at least one of a range of the peripheral color to be included in a correction target and a correction rate of the density value of the black component in the uncorrected monochrome image data corresponding to the peripheral color based on at least the calculated image rate for each of the pure colors, and determining the correction content for the image data of each of the pages.

* * * * *